(12) United States Patent
Stoev

(10) Patent No.: US 11,404,882 B2
(45) Date of Patent: Aug. 2, 2022

(54) METHODS AND SYSTEMS FOR AN AC GRID HAVING INCREASED POWER THROUGHPUT

(71) Applicant: ReEnergy Holding AG, Lachen (CH)

(72) Inventor: Alexander Stoev, Lachen (CH)

(73) Assignee: ReEnergy Holding AG, Lachen (CH)

( * ) Notice: Subject to any disclaimer, the term of this patent is extended or adjusted under 35 U.S.C. 154(b) by 0 days.

(21) Appl. No.: 17/429,229

(22) PCT Filed: Jan. 27, 2020

(86) PCT No.: PCT/EP2020/051862
§ 371 (c)(1),
(2) Date: Dec. 31, 2021

(87) PCT Pub. No.: WO2020/160944
PCT Pub. Date: Aug. 13, 2020

(65) Prior Publication Data
US 2022/0123558 A1      Apr. 21, 2022

(30) Foreign Application Priority Data
Feb. 8, 2019   (EP) ..................................... 19156215

(51) Int. Cl.
*G05D 9/00*   (2006.01)
*H02J 3/50*   (2006.01)
*H02J 3/06*   (2006.01)
*H02J 3/48*   (2006.01)

(52) U.S. Cl.
CPC .................................... *H02J 3/50* (2013.01); *H02J 3/06* (2013.01); *H02J 3/48* (2013.01)

(58) Field of Classification Search
CPC .................. H02J 3/50; H02J 3/06; H02J 3/48
USPC ......................................................... 700/298
See application file for complete search history.

(56) References Cited

U.S. PATENT DOCUMENTS 1,363,707 A     12/1920   Robert

OTHER PUBLICATIONS

International Search Report and Written Opinion of PCT/EP2020/051862 dated Mar. 4, 2020.
English translation of International Search Report of PCT/EP2020/051862 dated Mar. 4, 2020.
International Preliminary Report on Patentability of PCT/EP2020/051862 dated May 12, 2020.
English translation of International Preliminary Report on Patentability of PCT/EP2020/051862 dated May 12, 2020.

(Continued)

*Primary Examiner* — Daniel Kessie
*Assistant Examiner* — Dru Parries
(74) *Attorney, Agent, or Firm* — Polsinelli PC

(57) ABSTRACT

A method increases the power of an AC grid by means of the conductors which connect the grid coils of the grid transformer. The conductor-ground voltages and the AC phase voltage are kept lower than a voltage value. The sinusoidal phase voltages of the expanded grid are increased by up to 25% compared to the AC phase voltages, while the phase currents always remain sinusoidal. To this end, the Δ generators couple harmonic voltages between the conductors and ground and reduce the amplitude of the resulting hypersinusoidal conductor-ground voltages such that they always remain below the $U_{ix}$ value. In addition, the Δ generators control the transferred grid power.

15 Claims, 6 Drawing Sheets

(56) References Cited

OTHER PUBLICATIONS

English Translation of German Original Letter in Application No. PCT/EP2020/051862, dated Apr. 16, 2020, 2 pages.
International Preliminary Report on Patentability in Application No. PCT/EP2020/051862, dated May 12, 2020, 6 pages.

METHODS AND SYSTEMS FOR AN AC GRID HAVING INCREASED POWER THROUGHPUT

CROSS-REFERENCE TO RELATED APPLICATIONS

This application is a national stage application of International Application Number PCT/EP2020/051862, which was filed on Jan. 27, 2020, which claims priority to EP Application Number 19156215.6 filed on Feb. 8, 2019, each of which is incorporated by reference in its entirety.

FIELD

The present technology pertains to increasing the power throughput for a single-phase or a multi-phase AC grid.

BACKGROUND

The method and the system operating said method seek to increase the power of a new or existing AC grid by increasing the transmission capacity by up to 25% and reducing the specific line losses of AC grids by up to 44%. The installed output of the systems that are required for the application of the method should be less than 1% to 10% of the output of the AC grid.

The electrical energy is transmitted in AC grids with sinusoidal phase voltages $U_{ac}$ and by the sinusoidal nominal phase currents $I_{ac}$. The conductors required for this purpose are designed as underground cables, which are buried, or as overhead conductors, which are supported by poles. The phase current and the line losses are specified by the conductor cross-section. The amplitude of the nominal phase voltage $U_{ac}$, which is present at the output of the grid transformer, is equal to the amplitude of the conductor-ground voltages $U_{le}$, which are present between the conductors of the AC grid and ground. The conductor-ground isolators are designed for the insulation voltage $U_{lex}$.

The amplitude of the phase voltage $U_{ac}$ is also limited by the insulation voltage $U_{lex}$ since, according to the prior art, the amplitudes of the phase voltage $U_{ac}$ and the amplitude of the conductor-ground voltage $U_{le}$ are the same.

The power of the AC grid $P_{ac}$, which corresponds to the product $I_{ac}*U_{ac}$, is limited by the cross-section of the conductor and the insulation voltage $U_{lex}$. The maximum required insulation voltage $U_{lex}$ determines the parameters for the insulation of the conductors, i.e., the height of the poles and the length of the isolators in overhead conductor grids or the thickness of the isolator and the cable cross-section of the cables.

Several methods are known which increase the time areas of the phase voltages while maintaining the same amplitude and thereby generate more power with the same current and with the same amplitude of the phase voltage. In all methods, full inverters are used whose power is greater than or equal to the grid power $P_{ac}$.

This category of methods includes the high-voltage direct current (HVDC) transmission and the trapezoidal modulation. In a HVDC transmission, the AC currents and AC voltages are converted by a full inverter into direct voltage or DC voltage, transmitted and then converted back to AC currents and AC voltages by a second full inverter. The cost of a full inverter is high and so is the cost of the sinus filters that are needed to smooth the harmonics of the modulated currents and voltages. HVDC transmission is only used selectively for cost reasons.

Attempts have been made to implement hybrid grids with overhead conductors. AC voltages and AC currents are applied to a portion of the overhead conductors, and DC voltages and DC currents are applied to the remainder of the overhead conductors. The hybrid grids have not yet been used for cost reasons.

The trapezoidal modulation generates the trapezoidal phase voltages $U_{ac}$ and $U_{le}$. The trapezoidal modulation can be expanded up to a full-block modulation. Both the trapezoidal and the block-like phase voltages are not sinusoidal and have larger time areas than the sinusoidal phase voltages with the same amplitude. These methods require a full inverter as well, which is very complex. The voltage and current harmonics are impermissibly high for an AC energy transmission. That is why the trapezoidal or full-block modulation is mostly only used for motor drives. The third, ninth, etc. harmonic of the three-phase trapezoidal and full-block voltages cannot be transmitted by the grid transformers, which is why these voltages are not used for the transmission of electrical energy with AC grids and can only be used for local stand-alone supplies without AC grid transformers.

The so-called super sine modulation changes the phase voltage and the conductor-ground voltage. A full inverter modulates the sinusoidal phase voltages $U_{ac}$ and the third harmonic $U_3$ of the phase voltage from a DC voltage. The $U_3$ amplitude corresponds to approx. 16% of the $U_{ac}$ amplitude and is the same for all phases. The amplitude of the resulting phase voltage is 16% smaller than the $U_{ac}$ amplitude and is called the super sine. A full inverter can generate a 16% higher concatenated voltage $U_{ll}$ or 16% more power from the provided DC voltage with the super sine modulation than with the sine modulation. The grid transformer, which feeds the AC voltages into the AC grid, cannot transform the $U_3$ harmonic of the phase voltages. Only the sinusoidal phase voltages $U_{ac}$ appear on the (secondary) grid coils of the grid transformer.

The objective of the super sine modulation is to reduce the installed full inverter power and the inverter costs, respectively. The modulation is not used with the objective of increasing the power of the connected AC grid and reducing the losses in the grid lines, as is the objective of the present invention.

For this reason, the grid voltage $U_{ac}$ at the output of the grid transformer is not transformed to a higher value, and the insulation class of the grid transformers and their power class remain unchanged, which is different from the proposed method. Unlike the method proposed here, no hyper- or super-sinusoidal conductor-ground voltages appear on the (secondary) grid coils of the grid transformers and on the associated lines which carry high voltage and which transmit energy over long distances.

The solar and wind systems are connected to the low-voltage AC grid by a full inverter. The full inverters create a three-phase super-sinusoidal voltage. In this context, the installed power of the full inverter is reduced by 16%. The voltages that are transformed into the medium-voltage grid are sinusoidal because the grid transformers cannot transmit super-sinusoidal voltages. In these systems, the energy is transmitted with the sinusoidal $U_{le}$ and $U_{ac}$ voltages as well in accordance with the prior art.

The methods for increasing the time area of the grid voltages presented above have the disadvantage that full inverters are used and that the grid transformers cannot or do not have to transform these voltages, which is essential for the energy transmission with AC grids.

Overall, the following documents can be regarded as relevant prior art:
U.S. Pat. No. 3,211,914, October 1965
Article IEE Transactions Vol. 32 No. 1, February 2017, The Operation of Power Transmission
Patent application 25 09 177, file number P 25 0 177.4
U.S. Pat. No. 3,970,914, Jul. 10, 1976
DE 000001238094 A
U.S. Pat. No. 1,363,707, Dec. 28, 1920

The U.S. Pat. No. 3,211,914 and the IEE Transactions Vol. 32 No. 1 Feb. 2017 "The Operation of Power Transmission" propose to superimpose the three voltages $U_{le}$ of a three-phase AC grid with the third harmonic $U_3$ of the phase voltage. The grid coils of the transformers must be connected in Y, and an additional generator is connected between the star point of the grid coils and ground in order to feed in the $U_3$ voltage. The result is a super-sinusoidal $U_{le}$ voltage, which has an amplitude that is 11% smaller than the sinusoidal phase voltage $U_{ac}$. According to U.S. Pat. No. 3,211,914, the amplitude of the $U_3$ voltage is set at approximately 25% of the phase voltage $U_{ac}$. This allows the $U_{ac}$ and $U_{le}$ voltages to be increased so that the maximum value $U_{lex}$ of the conductor-ground voltage is exceeded. The resulting grid can transmit 11% more grid power than the original AC grid.

The article IEE Transactions Vol. 32 No. 1, February 2017 The Operation of Power Transmission specifies the amount of the $U_3$ voltage to be 16% of the phase voltage $U_{ac}$, and the amplitude of the resulting $U_{le}$ voltage should thus decrease by approx. 16%. This makes it possible to increase the $U_{ac}$ and the $U_{le}$ voltages by 16%, without the maximum value $U_{lex}$ of the isolator voltage being exceeded, in order to transfer 16% more energy.

The same article demonstrates that the distance between two $U_3$ generators is limited due to the phase shift of the $U_3$ voltage compared to the $U_{ac}$ voltage. This phase shift increases with the length of the conductor and increases the conductor-ground voltage $U_{le}$. The phase voltage $U_{ac}$ and the grid power must therefore be reduced. For this reason, the length of the conductor used for the $U_3$ method according to the prior art is limited. The permissible lengths of the conductors between two $U_3$ generators are approx. 30-40 km for overhead line grids and approx. 3-4 km for underground cable grids.

U.S. Pat. No. 1,363,707 introduces a method for the transmission of a main power with a low grid frequency $F_1$ of approx. 25 Hz through a three-phase AC grid together with a high-frequency auxiliary power with a frequency higher than 40 Hz. The main power is required for the traction of a train, which requires the high-frequency auxiliary line is required for flicker-free lighting. Both the main and the auxiliary power are active powers. For this purpose, the expansion of the three-phase AC grid with a fourth conductor (H) is proposed. The main feature of the method, according to this U.S. Pat. No. 1,363,707, is a three-phase AC grid, which is expanded with a fourth conductor. The three low-frequency main currents with the grid frequency $F_1$ flow between the three-phase conductors of the three-phase AC grid and transmit the main power, as is the case with a conventional AC grid. A single-phase current with three times the grid frequency transmits the auxiliary power and also flows through the fourth conductor and the three phase conductors. The fourth conductor is necessary because the single-phase current transfers the active power for supplying the lights. However, this method, according to U.S. Pat. No. 1,363,707, differs significantly from the present method both in terms of its objective and in terms of its implementation.

Below, the prior art is critically assessed: The maximum increase in grid performance by 11%, which is achieved with the method described in U.S. Pat. No. 3,211,914, is small. Since the $U_3$ amplitude is approx. 23% of the phase voltage, the effort for the generator of the $U_3$ voltage is considerable. The maximum increase in grid performance that can be achieved with the $U_3$ method is low at 16%. The phase shift of the $U_3$ voltage reduces this increase in grid power. The application of the $U_3$ method, according to the prior art, is limited. The $U_3$ method is limited to three-phase AC grids with overhead conductors. It is not clear how the $U_3$ method is to be used in AC grids with underground cables. According to the $U_3$ method, the grid coils must be switched in Y. It is not clear how the $U_3$ process can be used for grid transformers with Δ-switched grid coils. Medium-voltage grids, which make up approx. 40% of the AC grids, use grid transformers with Δ-switched grid coils as well.

The $U_3$ generators of the $U_3$ method must be located near the grid transformer. The grid transformers are usually located in transformer stations that are up to 100 km apart. The maximum distances between two $U_3$ generators are, due to the phase shift, limited to approx. 30 km.

Another unsolved problem in the implementation of the $U_3$ method with overhead line grids is the uncompensated E-fields that radiate the $U_3$ voltages. The E-fields of the three-phase voltages of a three-phase AC grid compensate each other. The E-fields that are generated by the three conductors due to the $U_3$ component in the $U_{le}$, on the other hand, add up to a larger $E_3$ field.

The $U_3$ method does not provide for the ground fault current, which occurs when a conductor is shorted to ground, to be extinguished with the help of the $U_3$ generator. The $U_3$ grid is not redundant.

The $U_3$ method does not provide for any transformation of the three-phase super-sinusoidal voltages because the conventional grid transformers cannot transform the $U_3$ voltages, which are the same for all three phases. This severely limits the use of the $U_3$ method.

The main objective of the method according to the present invention is to increase the power and efficiency of an existing or newly planned AC grid without changing and/or expanding the existing transmission path, i.e., without changing the number and the insulation of the grid conductors. In contrast to the teaching, according to U.S. Pat. No. 1,363,707, no fourth line is required because this would mean a more expensive expansion of the three-phase AC grid. The fourth conductor does not exist in three-phase AC grids with overhead conductors or with underground cables. Therefore, this method cannot be used with most three-phase AC grids. Only in AC grids for low voltage is a neutral conductor (ground conductor) sometimes used for protection purposes and cannot conduct high-frequency currents.

OBJECT OF THE INVENTION

The object of the invention is to create, in view of the prior art discussed above, a method for increasing the power of an AC grid and for reducing the line losses. Another object is to provide a system with which this method can be carried out. For this purpose, different embodiments of the method and the necessary system components are to be specified in order to use the method both in new installations and in existing AC grids with no or only minor changes.

The goal and thus also the object of the method is to modify an AC grid so that the modified AC grid is able to transmit approximately 25% more power with approximately 44% less specific losses than the original AC grid. The AC grid modified and/or expanded according to the method is referred to as the HAC grid, with H pointing to the generated hypersinusoidal phase voltage. The HAC grid, which is comparable to a traditional AC grid, has the same number of phases, the same phase current $I_{ac}$ and the same maximum value $U_{lex}$ of the isolator voltage as the AC grid.

Another object and a further goal is to implement the method in AC grids both with overhead conductors and underground cables. Another object is to make the method usable for both Δ-Y grid transformers as well as for Y-Δ grid transformers. The method should be applicable to both three-phase and single-phase AC grids.

It should be possible to convert an existing AC overhead line grid into an HAC overhead line grid without replacing the poles, overhead conductors and isolators that have already been installed. It should be possible to convert an existing AC cable grid into an HAC cable grid without having to replace the cables that have already been laid.

The method should also be able to be expanded in such a way that it is possible to regulate the grid power without regulation transformers. The method should also be able to be expanded, without the use of expensive arc suppression coils, so that it is possible to suppress the ground fault current in the event of a conductor-ground short circuit.

In addition, the method should allow for a redundant transmission of energy, i.e., it should be possible to operate the HAC grid as an AC grid in the event of a fault. The method should be designed in such a way that the emitted electric and magnetic fields are reduced. It should also be possible to implement the method over any distance between the grid transformers. The transformer that is able to transmit the voltages of the HAC grid should likewise be defined.

Another object and a goal of the invention is to define a system which allows for a cost-effective application of the method for the transmission of energy from regenerative energy sources (solar energy and wind energy) and from energy stores.

Solution According to the Invention

The solution to the technical problem consists of a method according to the features of claim 1. Sub-tasks are solved by the method according to the dependent claims 2 to 9. The methods can be implemented with systems according to claims 10 to 15.

The method according to this invention differs from the trapezoidal and the full-block modulation, which modify the phase voltages $U_{ac}$ in the following points:
  The phase voltages $U_{hac}$ remain sinusoidal,
  only the $U_{le}$ voltage form is modified and
  the power of the required inverters is much smaller than the grid power.
In contrast to U.S. Pat. No. 1,363,707, for example, the harmonic generators according to the invention deliver only reactive powers. The harmonic currents and their losses are at least one order of magnitude smaller than the harmonic currents and their losses, according to the method, according to U.S. Pat. No. 1,363,707.

BRIEF DESCRIPTION OF THE DRAWINGS

The figures illustrate the basic problem and show various variants of block diagrams and components for the implementation of the method. These are described and explained in detail below. The same also applies to the systems for the implementation of the methods.

In the drawings.

DETAILED DESCRIPTION

Figure 1:
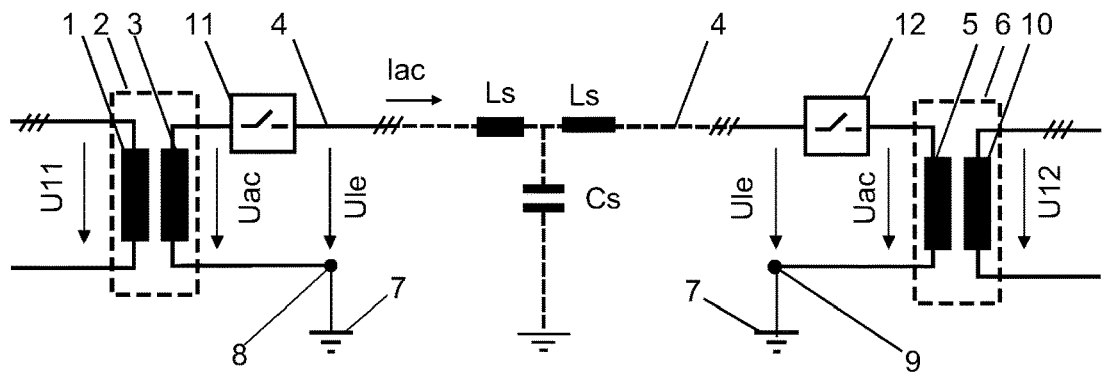
FIG. 1: is a block diagram of an AC grid according to the prior art.

In order to make the prior art more understandable, the configuration of a conventional AC grid, as shown in FIG. 1, is provided first. An AC grid consists of the grid transformers 2 and 6, respectively (hereinafter referred to as grid transformers) and the conductors 4, which connect the grid transformers. The electrical energy is transmitted by sinusoidal phase voltages $U_{ac}$ and phase currents $I_{ac}$. The industrial AC grids are three-phase. The low-voltage grids and the AC grids for electric railways are generally single-phase. The grid frequency $F_1$ of the phase voltages is specified with 50 Hz or 60 Hz for industrial grids and 16⅔ Hz for rail grids. The phase currents $I_{ac}$ and the phase voltages $U_{ac}$ are sinusoidal, and the proportion of the permitted voltage and current harmonics is limited by standards to less than 3%. The amplitude of the magnetic and electric fields emitted by the conductors is limited by standards as well.

The input coils and the output coils of a three-phase grid transformer, respectively, are switched either in a triangle (Δ) or in star form (Y). In the Δ-Y grid transformers, the input coils are switched in Δ and the output coils in Y. The Y-Δ transformers consist of Y-switched input coils and Δ-switched output coils. The star point 8 of the Y-switched coils is usually connected directly to ground 7 (grounded). The Δ-switched coils are usually not grounded.

The input coils 1 and 10, respectively, of the grid transformer 2 and 6, respectively, carry the lower input voltages $U_{11}$ and $U_{12}$, respectively. The output coils 3 and 5, respectively, are referred to here as grid coils and carry high voltages. Each grid coil 3 and 5, respectively, supplies a phase voltage $U_{ac}$ and is connected to the associated conductor 4 via the grid switch 11 and 12, respectively, as shown in FIG. 1.

The voltage $U_{ac}$ of a phase is measured between the connections of the grid coils. The phase voltage of a Y-switched grid coil $U_{le}$ is measured between the output of this grid coil 3 and the star connection 8. The phase voltage in grid transformers with Δ-switched grid coils is present between the output of the grid coil and a virtual star point.

The maximum value $U_{lex}$ of the voltage between a conductor 4 and ground 7 defines the maximum insulation voltage from the conductor to ground. According to the prior art, the conductor-ground voltages $U_{le}$ of an AC grid are equal to the phase voltages $U_{ac}$ of this grid.

The voltage, which is applied between two conductors, is called conductor-to-conductor or concatenated voltage $U_{ll}$. The AC energy transmission takes place at high voltages with the following categories of the conductor-to-conductor voltage values:

Extra-high voltages (EHV)>110 kV,
High voltages (HV)>50 kV and
Medium voltages (MV)>1 kV.

The higher the voltage, the more power is transmitted from the AC grid.

The maximum value $U_{lex}$ of the isolator voltage determines the costs of an AC installation. The higher the grid voltage, the greater and more expensive the insulation expenditure. The amplitude of the conductor-ground voltage $U_{le}$ and the amplitude of the equivalent phase voltage $U_{ac}$ have to be smaller than the maximum value $U_{lex}$:

$$\max(U_{le})=\max(U_{ac})<U_{lex}$$

If the maximum value $U_{lex}$ is exceeded, the conductor insulation breaks and the isolator around the conductor is temporarily or permanently damaged. Insulation monitoring devices monitor the maximum conductor-ground voltage and switch off the AC grid if the maximum value $U_{lex}$ is exceeded.

The phase voltages and the phase currents of the overhead conductors emit electric fields (E-fields) and magnetic fields (B-fields). The maximum values of these unwanted E- and B-fields are limited by standards. The $U_{le}$ spectrum, on the other hand, is not stipulated. For AC overhead line grids, the maximum values of the $U_{le}$ harmonics are stipulated. In underground cable grids, the maximum values of the $U_{le}$ harmonics are not relevant because the conductors are shielded.

The conductors 4 are characterized by distributed inductances $L_s$ and by distributed capacitances $C_s$ with respect to ground—as shown in FIG. 1. Both the phase voltages $U_{ac}$ and the harmonics of the grid voltages generate capacitive equalizing currents.

The direction of the energy transfer is determined by the difference between the phase voltages $U_{ac}$ of the feeding transformers 2 and the loading transformers 6 as well as by the impedance of the connecting lines 4. The feeding phase voltage of the grid transformer 2 is higher than the loading phase voltage of the grid transformer 5. This compensates for the voltage drops across the line impedances of the connecting lines with the voltage difference being in the percentage range of the $U_{ac}$ voltage. The greater this difference, the more current $I_{ac}$ flows through the lines 4, and the more power is transmitted. The phase positions of the $U_{ac}$ voltages of the supplying grid transformers 2 and the loading grid transformers 6 differ slightly from one another.

The power of a grid transformer—both the active power and the reactive power—is often regulated. The need for regulation increases with the use of regenerative sources. The power of a grid transformer is regulated by an additional regulating transformer (called regulating transformer here), which varies the amplitudes and phases of the phase voltages of the grid transformer by coupling the variable regulating voltages $U_r$ to the phase voltages and thus adding them to these. In most prior art applications, the regulating voltage $U_r$ is less than 10% of the phase voltage $U_{ac}$. According to the prior art, the regulating voltage is adjusted with on-load tap changers, a process that is slow and imprecise.

The most common source of error in the operation of an AC grid is the short circuiting of a conductor to ground. In the event of a ground fault, large ground fault currents flow. In this case, the maximum value of the conductor-ground voltage $U_{le}$ of ungrounded three-phase AC grids (medium-voltage grids) increases to 1.71 times the phase voltage $U_{ac}$. The ground fault current is extinguished with a ground fault extinguishing coil (Petersen coil). The Petersen coil has a variable inductance and is complex in its construction.

In consideration of the above, it is the goal of this invention to replace the sinusoidal voltages between the conductors and ground $U_{le}$ by introducing so-called hypersinusoidal voltages $U_{hle}$ between the conductors and ground. The hypersinusoidal conductor-ground voltages $U_{hle}$ are derived from the higher phase voltages $U_{hac}$ by coupling and decoupling high-frequency differential voltages $\Delta U$.

Figure 2:
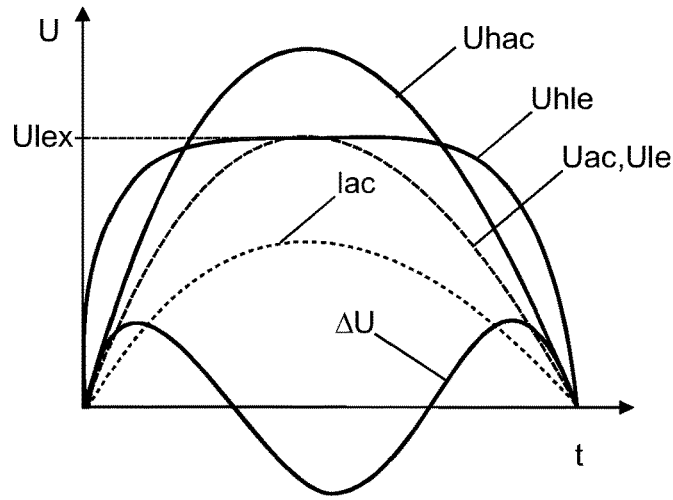
FIG. 2: is one voltage each $U_{hle}$, $U_{hac}$, ΔU of the HAC grid and the associated voltages $U_{le}$ and $U_{ac}$ of the original AC grid, as well as the associated phase current $I_{ac}$.

A hypersinusoidal conductor-ground voltage $U_{hle}$ is "wider" than the sinusoidal conductor-ground voltage $U_{le}$ with both voltages having the same amplitude, which the insulation voltage $U_{lex}$ cannot exceed according to the invention, as illustrated in FIG. 2.

According to the invention, the hypersinusoidal conductor-ground voltage $U_{hle}$ of an HAC grid has the voltage-time area of the associated phase voltages $U_{hac}$ and an amplitude which is less than or equal to the insulation voltage $U_{lex}$ and less than the amplitude of the phase voltage $U_{hac}$, respectively. In other words, the amplitude of the phase voltages $U_{hac}$ of an HAC grid is greater than the amplitude of the conductor-ground voltage $U_{hle}$ of this grid and greater than the insulation voltage $U_{lex}$. According to the invention, the amplitude of the phase voltage $U_{hac}$ is at the most $(1-\pi/2)$ ~57% higher than the $U_{hle}$ amplitude or than the insulation voltage $U_{lex}$. The increase in the phase voltage $U_{hac}$ and the resulting higher power $P_{hac}$ of the HAC grid is reduced to approx. 25% for technical reasons. The power increase takes place unchanged with the nominal phase current $I_{ac}$. This means that the ohmic transmission loss of the conductors remains unchanged.

The power loss, based on the higher HAC grid power (i.e., the specific line losses), is reduced by approx. 25%.

For the transmission of the nominal AC power $P_{ac}$ with the higher $U_{hac}$ voltage, 25% less current is required. In this case, the specific line losses are reduced quadratically with the current by 44%. The conductor-ground isolator voltage $U_{lex}$ and the nominal current $I_{ac}$ remain the same so that the method can be used in an existing AC grid with overhead conductors or cables without changing the transmission path. However, the insulation class of the grid transformer must be adapted for the higher phase voltage $U_{hac}$ and the nominal power must be increased by up to 25%.

The phase voltages $U_{hac}$ and the phase currents $I_{ac}$ of the HAC grid remain sinusoidal. This ensures that the standards that limit the harmonic content of the phase voltages and the phase currents are met. The magnetic radiation (smog), which is generated by the changed phase currents $I_{ac}$ also remains unchanged. With the higher sinusoidal phase voltages $U_{hac}$, the higher grid power $P_{hac}$ is transmitted with the nominal phase currents $I_{ac}$ and the same transmission loss. A method is also to be demonstrated which allows for the generation and application of these hypersinusoidal voltages. The installed power of the systems that generate the hypersinusoidal voltages should be 10 to 100 times less than the grid power. It follows that the cost of these systems is much smaller than the cost of the grid installation.

The presented method is essentially implemented by two measures:
a) by coupling a suitable differential voltage $\Delta U$ between the conductors of the AC grid and the grid coil, the resulting hypersinusoidal conductor-ground voltage $U_{hle}$ is increased by up to $2/\pi \sim 64\%$, as the maximum value of the insulation voltage $U_{lex}$
b) which makes it possible to reduce the phase voltage at the output of the grid coils by a maximum $\pi/2 \sim$ by 157% to the value $U_{hac}$. The $U_{hle}$ voltages increase proportionally to the phase voltages $U_{hac}$ but remain less than or equal to the insulation value $U_{lex}$.

The $\Delta U$-voltages are generated by so-called $\Delta$-generators and consist of harmonics of the associated phase voltages $U_{hac}$.

With the higher sinusoidal phase voltages $U_{hac}$, together with the nominal sinusoidal phase current $I_{ac}$, a grid power is transmitted that is up to 57% or a factor of 157% higher. The predominantly ohmic transmission loss remains unchanged. Since the maximum conductor-ground voltage $U_{lex}$ is not exceeded, the modified grid can be operated with existing AC lines since the conductor-ground isolators can remain unchanged. As with the AC grid, the transmission takes place with the sinusoidal phase currents $I_{ac}$ and with the sinusoidal phase voltages $U_{hac}$, i.e., free of harmonics. Only the reference potential of the conductors to ground is hypersinusoidal and has harmonics.

FIG. 1 is a block diagram of a three-phase AC grid according to the prior art. The three-phase grid transformers 2 and 6 consist of the input coils 1 and 10 and the grid coils 3 and 5, respectively. Three sinusoidal input voltages $U_{11}$, $U_{12}$ are applied to the input coils 1 and 10, respectively. The three grid coils 3, 5 are usually switched in Y, the three input coils 1, 10 are usually switched in $\Delta$. The star connections 8 and 9 of the grid coils 3 and 5, respectively, are connected to ground 7. If necessary, the grid switches 11, 12 separate the grid coils 3 and 5, respectively, from the conductors 4. The conductors 4 are characterized by the distributed inductances $L_s$ and by the distributed capacitances $C_s$. The three sinusoidal phase voltages $U_{ac}$ at the outputs of the grid coils 3 and 5 of the three-phase AC grid, respectively, are equal to the three voltages $U_{le}$ which are applied between the conductors 4 and ground 7, as illustrated in FIG. 2. The three sinusoidal $U_{le}$ voltages are always smaller than the value $U_{lex}$. The same ratios also apply to a single-phase AC grid:

$$U_{ac}=U_{le} \leq U_{lex}$$

The method according to claim 1 now requires for the first time that the transformation ratios of all grid transformers 2, 6 are increased whereby the amplitudes of the sinusoidal phase voltages $U_{hac}$ are greater than the amplitudes of the $U_{ac}$ voltages or greater than the insulation value $U_{lex}$:

$$U_{hac}>U_{lex}>U_{ac}$$

The grid coils 3 and 5, respectively, which supply the voltages $U_{hac}$, cannot be directly connected to the conductor 4 because the $U_{hac}$ amplitude is higher than the maximum $U_{lex}$ value, i.e., the phase-ground isolators could otherwise be triggered.

Figure 3:
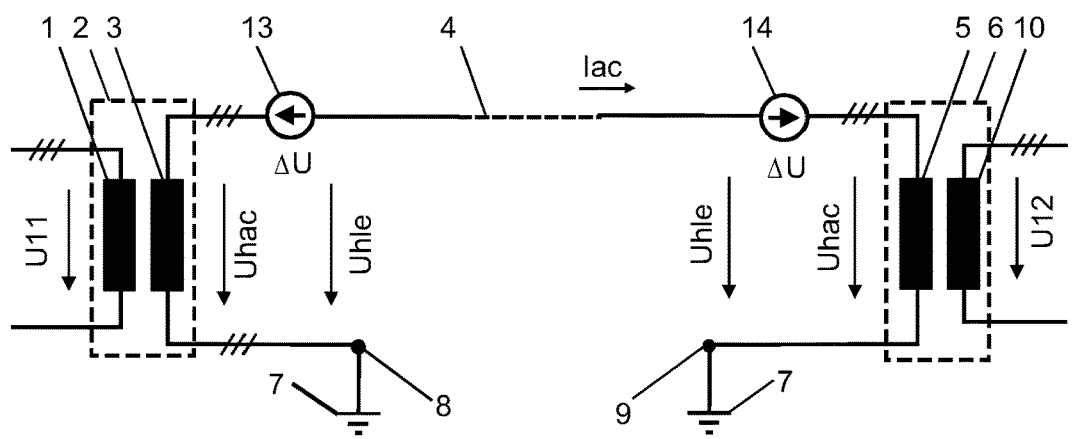
FIG. 3: is a block diagram of an HAC grid with Δ-generators.

According to the invention, as shown in FIG. 3, to each grid transformer 2 and 6, respectively, a $\Delta$-generator 13 and 14, respectively, is assigned, which is connected between a grid coil 3 and 5, respectively, of the grid transformer and the associated conductor 4. The number of phases of the $\Delta$-generators 13 and 14, respectively, corresponds to the number of phases of the associated grid transformer.

The $\Delta$-generators 13, which are connected to the feeding grid transformers 2, couple (add) the differential voltages $\Delta U$ to the $U_{hac}$ voltages of the associated grid coils 3 and generate the voltages $U_{hle}$ between the conductors 4 and ground 7. A comparison with the graph in FIG. 2 is instructive in this regard.

The $\Delta$-generators 14, which are connected to the loading grid transformers, for example 6, couple (subtract) the differential voltages $\Delta U$ from the $U_{hle}$ voltages of the associated conductors 4 so that only the sinusoidal voltage $U_{hac}$ is applied to the grid coils 5 of the loading grid transformers 6, as shown in FIGS. 2 and 3.

The phases and the amplitudes of the $\Delta U$ voltages are selected in such a way that the amplitudes of the resulting voltages $U_{hle}$, which are applied between the conductors 4 and ground 7, are smaller than the voltage value $U_{lex}$, as can be seen in FIG. 2. The HAC grid is characterized by the hypersinusoidal conductor-ground voltages $U_{hle}$.

The coupled $\Delta U$ voltages reduce the amplitudes of the $U_{hle}$ voltages below the permitted voltage value $U_{lex}$ of the original AC grid. This makes it possible to connect the conductors 4 of the grid route of the original AC grid to the grid coils 3 and 5 of the grid transformers 2 and 6, respectively, although the phase voltages $U_{hac}$ on the grid coils are greater than the nominal voltages $U_{ac}$ of the AC grid! With a nominally constant phase current $I_{ac}$, the HAC grid consequently transmits a higher power $P_{hac}$. To each voltage $U_{le}$ or $U_{ac}$, a $\Delta U$-voltage is assigned, i.e., a single-phase grid has a $\Delta U$-voltage and a three-phase grid has three $\Delta U$-voltages, which are assigned to the three phases.

Both the feeding grid transformers 2, which feed the higher phase voltages $U_{hac}$ from the input voltages $U_{11}$ into the HAC grid, and the loading grid transformers 6, which transform the $U_{hac}$ voltages to the $U_{12}$ voltages, must have a larger transmission ratio and a higher insulation from ground and be designed for the higher HAC power $P_{hac}$. The grid transformers of the original AC grid are designed for the smaller (nominal) power $P_{ac}$.

Each super-sinusoidal voltage $U_{hle}$, which is applied between a conductor 4 and ground 7 of the HAC grid, corresponds to the sum of a phase voltage $U_{hac}$ with the associated voltage $\Delta U$, as is the case in an arrangement according to FIG. 3 and as can be seen from FIG. 2.

$$U_{hle}=U_{le}+\Delta U$$

The two $\Delta U$-voltages of each closed phase circuit in an arrangement, according to FIG. 3, with a feeding grid transformer 2 and with a loading grid transformer 6 are opposite and cancel out each other. This also applies if the direction of the energy transfer between the loading and the feeding transformer changes. Accordingly, a sinusoidal voltage $U_{hac}$ at the output of the grid coils 3 of a supplying grid transformer 2 of an arrangement according to FIG. 5 generates a sinusoidal output voltage $U_{12}$ at the output coils 10 of the loading grid transformer 6. The voltage difference between two connected grid coils 3 and 5, respectively, which drives the phase current $I_{ac}$ through the conductor 4, is sinusoidal because the two oppositely directed ΔU-voltages of the Δ-generators 13 and 14, respectively, compensate each other. This is why the phase current $I_{ac}$ remains sinusoidal.

The losses, the phase shifts and the conductor impedances along the real conductor path slightly change the amplitude and the phase of the voltages $U_{hac}$. According to the prior art, the ohmic voltage drops are compensated for with the design grid transformers 2 and 6, respectively, or with a regulating transformer. Phase shifts of the ΔU-voltages along the route are determined by the Δ-generators 13 and 14, respectively.

Any ΔU-voltage consists of harmonics with the frequencies $f_i$, which are equal to a multiple of the grid frequency $F_1$:

$$F_i = (2*1-1)*F_1, \text{with } i=1,2,3,4 \ldots$$

The method prescribes how the hypersinusoidal $U_{hle}$ voltages and the sinusoidal $U_{hac}$ voltages are determined whereby the associated ΔU-voltages are determined as well.

The hypersinusoidal voltage $U_{hle}$ with a maximum time area is rectangular, has an amplitude equal to $U_{lex}$ and a very high maximum harmonic frequency $F_{ix}$.

The smaller the maximum frequency $F_{ix}$, the smaller the $U_{hle}$ time area and the associated $U_{hac}$ time area. The smaller the $U_{hac}$ time area, the smaller the amplitude of the $U_{hac}$ voltage and the power $P_{hac}$ of the HAC grid.

The rectangular $U_{hle}$ voltage with the amplitude $U_{lex}$ and the sinusoidal $U_{hac}$ voltage with the amplitude $$\frac{\pi}{2} * U_{lex}, \sim 1.57 * U_{lex}$$

have the same time areas. Accordingly, the $U_{hac}$ amplitude must not exceed $$\frac{\pi}{2} * U_{lex},$$

i.e., it may be selected to be greater than the amplitude of the original phase voltage $U_{ac}$, as can be seen from FIG. 2.

The hypersinusoidal $U_{hle}$ voltages that arise from the $U_{hac}$ voltages are synchronous with the associated $U_{hac}$ voltages with the fundamental frequency $F_1$ (grid frequency), as can also be seen from FIG. 2.

The ΔU-voltages are also synchronous with the $U_{hac}$ voltages. The $U_{hac}$ and $U_{hle}$ voltages of the HAC grid are synchronous with the equivalent voltages $U_{ac}$ and $U_{le}$ of the original AC grid, as can be seen from FIG. 2, because both the $U_{ac}$ and the $U_{hac}$ voltages arise from the transformation of the same input voltages $U_{11}$ and $U_{12}$ that are present in the embodiment according to FIG. 3. The AC current $I_{ac}$ is also synchronous and in phase with the phase voltages $U_{hac}$ and $U_{ac}$—see FIG. 2.

The sum of the integral values of the product of the nominal phase currents $I_{ac}$ with the associated ΔU-voltages of a three-phase HAC grid is calculated as $$3 * \int I_{ac} * \Delta U$$

and corresponds to the real power that the Δ-generators require for coupling the ΔU-voltages. The total value is zero. This means that the Δ-generators only supply apparent power (reactive power). This also applies to single-phase or multi-phase grids.

Figure 11:
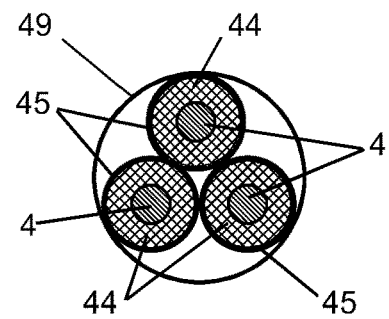
FIG. 11: is an illustration of the cross-section of a three-core underground cable, which is suitable for use in three-phase HAC grids.

The cross-section of the conductor 4 of an underground cable 49, according to FIG. 11, of an existing AC route with underground cables is defined by the nominal current $I_{ac}$. The thickness of the insulation 44 around the voltage-charged conductor 4 is determined by the $U_{lex}$ value, i.e., by the maximum value of the conductor-ground voltage $U_{le}$.

If the HAC grid is operated with the nominal phase current $I_{ac}$ and the amplitude of the hypersinusoidal voltages $U_{hle}$ are selected to be less than or equal to $U_{lex}$, then the existing AC route can be operated as an HAC grid with the higher power $P_{hac}$.

Figure 12:
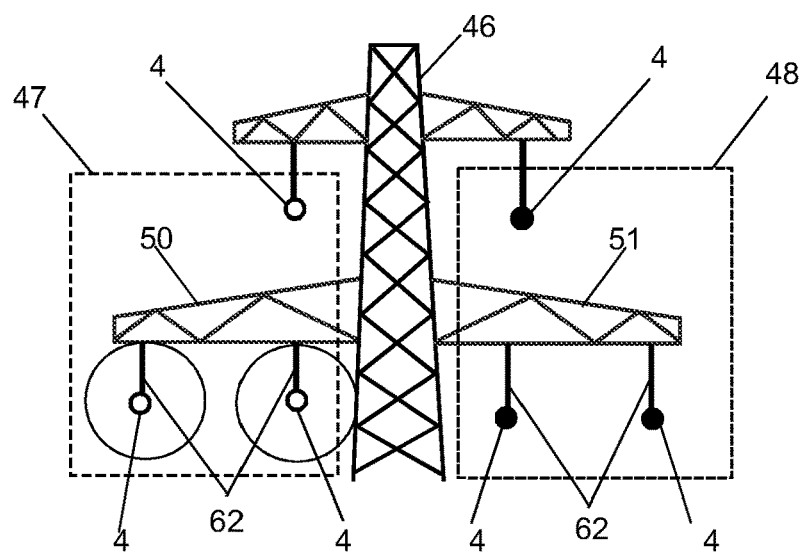
FIG. 12: is an illustration of an overhead pole with two three-phase systems with reduced electrical and magnetic stray fields.

If an HAC grid is designed with overhead conductors, as shown in FIG. 12, and is operated with the nominal phase current $I_{ac}$, the cross-section of the overhead conductors of the original AC route remains unchanged. If the hypersinusoidal conductor-ground voltages $U_{hle}$ are smaller than or equal to $U_{lex}$, the isolators 62 and the poles 46 of the overhead conductor route, which is also designed for the $U_{lex}$ value, remain unchanged. As a result, the HAC grid can be operated with the unchanged AC overhead conductor route under these conditions.

Any ΔU-voltage of a three-phase or a single-phase HAC grid is, according to the invention, divided into two voltages $U_s$ and $U_h$. The frequencies of the harmonics of the $U_s$ voltage correspond to $F_1 * 3 * (2*i-1)$ with $i=1, 2, 3 \ldots$ and with the fundamental frequency $F_1$ equal to the grid frequency. The $U_h$ and $U_s$ voltages are in phase with the phase voltages $U_{hac}$. The $U_s$ voltages for the three grid phases of a three-phase grid are the same and can only be transmitted by three single-phase grid transformers and not by one three-phase AC grid transformer.

Each of the $U_h$ voltages of a phase is derived from the difference between the associated ΔU-voltage formed with the $U_s$ voltage. Each $U_h$ voltage consists of the fifth, seventh, eleventh, etc., harmonic of the associated phase voltage $U_{hac}$. The sum of the three $U_h$ voltages of a three-phase AC grid is zero. Both single-phase and three-phase $U_h$ voltages can be transmitted by AC grid transformers.

FIG. 3 is a block diagram of a three- or single-phase HAC grid. The three-phase HAC grid was achieved by expanding an original three-phase AC grid with the three-phase $\Delta_3$-generators 13, 14, which generate and couple the three-phase ΔU-voltages. The feeding grid transformer 2 transforms the sinusoidal voltages $U_{11}$, which are applied to the input coils 1, to the sinusoidal phase voltages $U_{hac}$, which are applied to the grid coils 3. The $\Delta_3$-generator 13 couples (adds) the three associated ΔU-voltages to the three $U_{hac}$ voltages and forms the hypersinusoidal voltages $U_{hle}$ between the associated conductors 4 and ground 7. The three sinusoidal phase currents $I_{ac}$ are conducted through the $\Delta_3$-generator 13 in an unchanged manner. The $\Delta_3$-generator 14 couples (subtracts) the associated ΔU-voltages from the $U_{hac}$ voltages and forms the three sinusoidal phase voltages $U_{hac}$, which are applied to the grid coils 5 of the loading grid transformer 6. The three sinusoidal phase currents $I_{ac}$ are conducted through the $\Delta_3$-generator 14 in an unchanged manner.

The $\Delta_3$-generators 13 in the embodiment according to FIG. 3, which are connected to the grid coils 3 of the feeding grid transformers 2, measure the $U_{hle}$ voltages, the $U_{hac}$ voltages and the currents $I_{ac}$ at a high sampling rate (>$10*F_{ix}$) and ensure that the frequencies, the amplitudes and the phases of the coupled ΔU-voltages are adjusted online so that the correct hypersinusoidal voltages $U_{hle}$ are present between the conductors 4 and ground 7 at all times and the phase voltages $U_{hac}$ are in phase with the associated phase currents $I_{ac}$.

The $\Delta_3$-generators 14, which are connected to the grid coils 5 of the loading grid transformers 6, measure the voltages $U_{12}$ and the phase currents $I_{ac}$, which are passed on to the consumers and ensure that the frequencies, the amplitudes and the phases of the decoupled $\Delta U$-voltages can be adjusted online so that the $U_{12}$ voltages are free of harmonics and in phase with the associated phase currents $I_{ac}$. The topology of a single-phase HAC grid is the same, but single-phase $\Delta 1$-generators are used instead.

Figure 6:
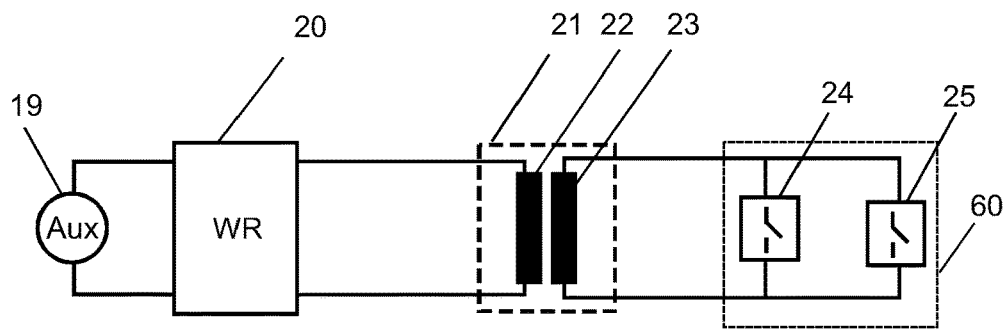
FIG. 6: is an illustration of the basic structure of a Δ-generator.

FIG. 6 shows the basic structure of a $\Delta$-generator, which is either single-phase (for a single-phase AC grid) or three-phase (for a three-phase AC grid). A single phase $\Delta_1$-generator consists of a single-phase inverter 20, which generates the $\Delta U$-voltage and is supplied by the source 19. The single-phase coupling transformer 21 transforms the $\Delta U$-voltage from the input coil 22 to the output coil 23 in an electrically insulated manner. The single-phase mechanical switch 24 bridges the output coil 23 and protects the $\Delta_1$-generator from overvoltages. The single-phase electronic switch 25 shortens the switch-on delay below 100 µs and is optionally installed.

A $\Delta_2$-generator is an embodiment variant of the single-phase $\Delta_1$-generator. The difference is that the coupling transformer 21 is equipped with two output coils 23, which are the same but provide opposite $\Delta U$-voltages. The three-phase $\Delta_3$-generator is like the single-phase $\Delta_1$ generator, but both the inverter 20 and the coupling transformer 21 as well as the switches 24 and 25, respectively, are three-phase.

For the coupling of the $\Delta U$-voltages, only apparent power is required because a $\Delta$-generator provides, in normal operation, only the capacitive currents that are required for reloading the conductor capacities $C_s$. Accordingly, the power of the supply 19, which only covers the losses of the inverter 20 and the coupling transformer 21, is less than 1% of the HAC grid power $P_{hac}$.

The wider the spectrum of the $\Delta U$ voltages, the larger the hypersinusoidal $U_{hle}$ time areas and the higher the $U_{hac}$ voltages and the grid power $P_{hac}$. The $\Delta U$-harmonics generate high-frequency electrical and magnetic fields, which are severely limited by standards. In addition, capacitive currents are excited in the conductor-ground capacitors, which leads to losses in the conductors and in the cable shields.

For these reasons, the following frequencies of the $\Delta U$ harmonics are relevant in practice for an industrial grid with 50/60 Hz:

The $\Delta U_9$ voltage, the spectrum of which is limited to the ninth harmonic, leads to an increase in grid power by up to 25%;

The $\Delta U_7$ voltage, the spectrum of which is limited to the seventh harmonic, leads to an increase in grid power by 23%;

The $\Delta U_5$ voltage, the spectrum of which is limited to the fifth harmonic, leads to an increase in grid power by 20%;

The $\Delta U_3$ voltage, the spectrum of which is limited to the third harmonic, leads to an increase in grid power by 16%.

In a rail grid, the $F_{ix}$ frequency can be increased by a factor of 3 because the fundamental frequency $F_1$ is equal to 16⅔ Hz.

The ohmic line losses of the HAC grid and the original AC grid are the same if the phase currents maintain the nominal value $I_{ac}$. The line losses of an HAC grid related to the grid power are at the most 44% lower than the specific power losses of the original AC grid. The related power losses of the HAC grid with limited harmonic frequencies are between 25% and 44% lower than the related power losses of the original AC grid.

Below, three embodiments of the S generators, which generate the $U_s$ voltages, are presented: the $S_1$ generator, the $\Delta S$-generator and the $S_3$ generator.

The single-phase $S_1$ generator is configured like the single-phase $\Delta 1$-generator as shown in FIG. 6. The single-phase inverter 20 generates the voltage $U_s$; the single-phase coupling transformer 21 couples this voltage to the output coil 23, which is bridged by the switch pair 24, 25 if necessary.

Figure 7:
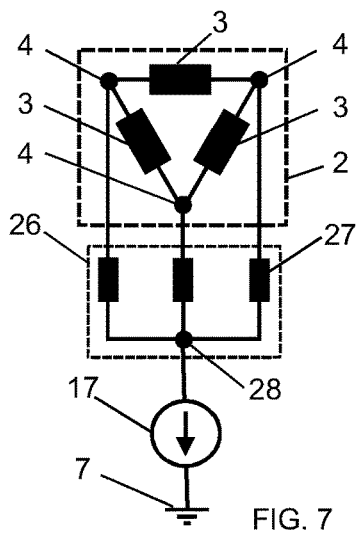
FIG. 7: is an illustration of the extension of the Δ-switched coils of a grid transformer with a grounding transformer and with an $S_1$ generator.

When the grid coils of a grid transformer are $\Delta$-switched, as shown in FIG. 7, then a grounding transformer 26 is connected between the $S_1$ generator 17 and the grid coils 3, the coils 27 of which form the star point 28 and are connected to the grid conductors 4. This so-called $\Delta S$-generator can be connected at any point along the conductor route of the AC grid and couple in the $U_s$ voltages.

Figure 4:
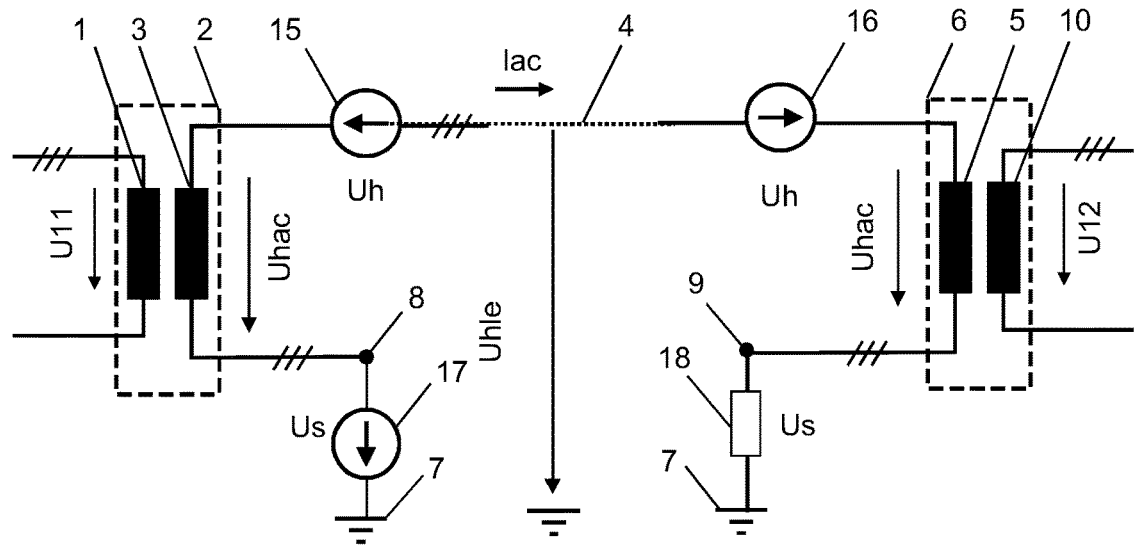
FIG. 4: is a block diagram of a three-phase HAC grid with $H_3$ and $S_1$ generators.
Figure 8:
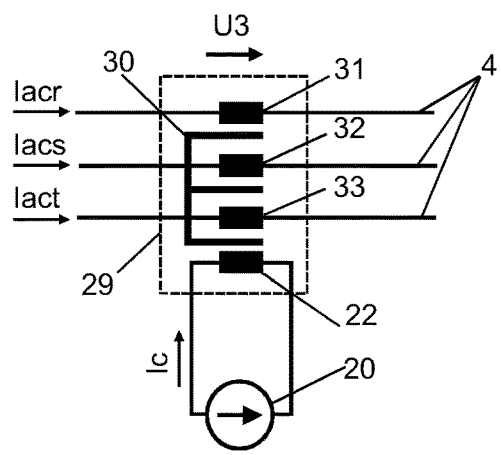
FIG. 8: is an illustration of the design of an $S_3$ generator for three-phase grids.

A so-called $S_3$ generator, as shown in FIG. 8, generates three identical potential-separated voltages $U_s$ and is constructed like an $S_1$ generator with the following differences. The coupling transformer 29 of the $S_3$ generator is equipped with three potential-separated output coils 31, 32, 33, which are coupled to the input coil 22 via the common magnetic core 30. One output coil 31, 32, 33 each is connected between a conductor 4 and the associated grid coil 3. With reference to FIG. 4, the grid transformer 2, which is expanded with an $S_3$ generator 17, must be equipped with a star point 8 which is grounded, as shown in FIG. 4. Each of the output coils 31, 32, 33 of the $S_3$ generator supplies the voltage $U_s$, and these output coils 31, 32, 33 conduct the phase currents $I_{acr}$, $I_{acs}$, $I_{act}$, as shown in FIG. 8.

Below, three embodiments of the H-generators, which generate the $U_h$ voltages, are presented: the $H_1$ generator, the $H_2$ generator and the $H_3$ generator.

The structure of a single-phase $H_1$ generator corresponds to the structure of a $\Delta 1$-generator, as shown in FIG. 6. The single-phase inverter 20 generates the voltage $U_h$, and the single-phase coupling transformer 21 transmits this voltage to the output coil 23, which is connected between a grid coil 3 and 5, respectively, and a line 4 (FIG. 4).

The structure of a single-phase $H_2$ generator corresponds to the structure of a $\Delta_2$ generator, as shown in FIG. 6. The single-phase inverter 20 generates the voltage $U_h$, and the coupling transformer 21 couples this voltage to two potential-separated output coils 23, which supply two identical and opposite $U_h$ voltages. The $H_2$ generator is used in single-phase AC grids. Two $H_1$ generators can be combined to form one $H_2$ generator.

The structure of a three-phase $H_3$ generator corresponds to the structure of an $H_1$ generator. A three-phase inverter 20 generates the three $U_h$ voltages, and the three-phase coupling transformer 21 transforms the $U_h$ voltages to the three output coils 23. The $H_3$ generator is used in three-phase grids. Three $H_1$ generators can be combined to form one $H_3$ generator. Every $\Delta 1$-generator, $\Delta 2$-generator or $\Delta 3$-generator can be assembled from the embodiment variants of the S- and H-generators.

FIG. 4 shows the topology of a three-phase HAC grid with at least one $S_1$ generator, which is connected to the star points 8 of the grid coils 3 of at least one grid transformer 2 and to one $H_3$ generator 15 and 16 each, which is connected to a grid coil 3 and 5, respectively of the grid transformers 2 or 6. The star connections 9 of the grid coils 5 without $S_1$ generators may not be grounded or only with a very high resistance because the $S_1$ generators are short-circuited when a star connection 9 is grounded. Another possibility is to terminate the star connections 9 without an $S_1$ generator 17 with a terminating impedance 18 each, which is matched so that the voltage across the terminating impedance 18 corresponds to the required $U_s$ voltage.

Figure 5:
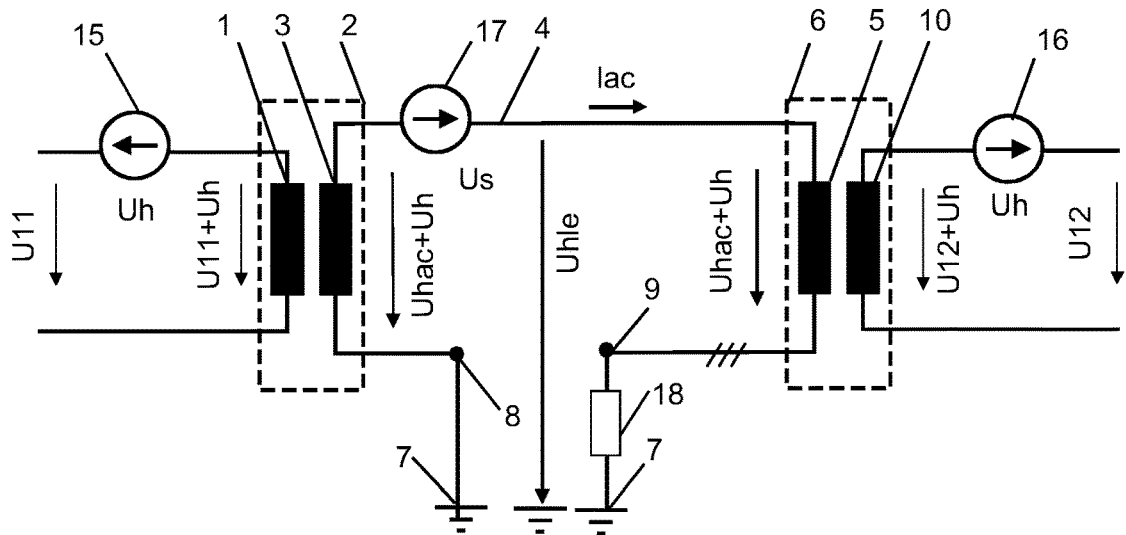
FIG. 5: is a block diagram of a three-phase HAC grid with $H_3$ and $S_3$ generators.

FIG. 5 shows the topology of a three-phase HAC grid with at least one $S_3$ generator, which is connected between the conductors 4 and the grid coils 3 of at least one grid transformer 2, and each with an $H_3$ generator 15 and 16, respectively, which is connected to the three input coils 1 and 10 of the grid transformers 2 and 6, respectively. The star connections 9 of the grid coils 2, which are connected to the $S_3$ generator, must be grounded so that the hypersinusoidal voltages $U_{hle}$ are created. The star connections 9 of the grid coils 5, which are free, cannot be grounded or only with a very high resistance so that the $U_s$ voltages are not short-circuited. Another possibility is to terminate the free star connections without an $S_1$ generator with a terminating impedance 18 each, which is matched so that the voltage across the terminating impedance 18 corresponds to the $U_s$ voltage.

Figure 9:
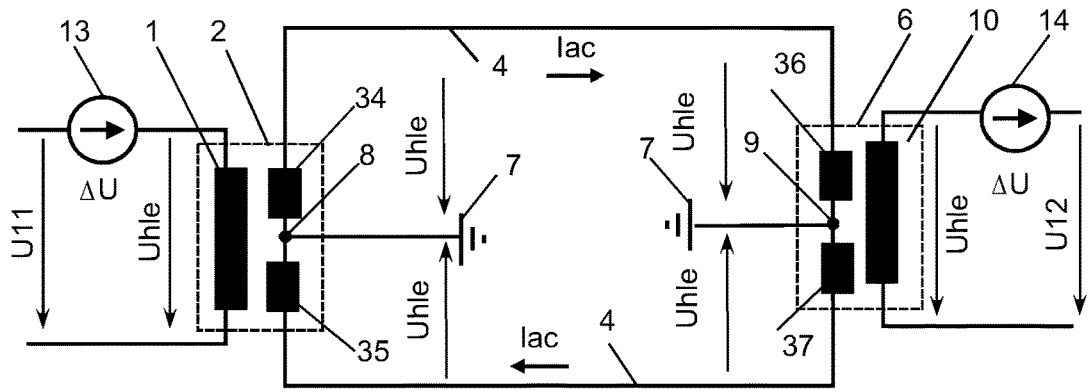
FIG. 9: is a block diagram of a single-phase HAC grid.

FIG. 9 shows the topology of a single-phase HAC grid. Each single-phase grid transformer 2 and 6, respectively, is assigned one Δ1-generator 13, 14 each, which is connected to the input coil 1 and 10, respectively. The output coil of each single-phase grid transformer 2 and 6, respectively, is divided into two equivalent grid coils 34, 35 or 36, 37 by a central tap 8 and 9, respectively. The central taps 8, 9 are grounded. The single phase Δ1-generator 13 couples (adds) the associated ΔU-voltage to the input voltage $U_{11}$ of the feeding grid transformer 2 and forms the hypersinusoidal voltages $U_{hle}$, which are transformed to the grid coils 34 and 35, respectively. The hypersinusoidal voltages on the grid coils 34 and 35, respectively, are equal and opposite. Two conductors 4 each connect at least one feeding grid transformer 2 to at least one loading grid transformer 6. The phase currents $I_{ac}$ of both conductors 4 are equal and opposite. The loading grid transformer 6 transforms the hypersinusoidal voltage $U_{hle}$ of the grid coils 36 and 37, respectively, to the input coil 10 of the loading grid transformer 6. The Δ-generator 14 couples (subtracts) the associated ΔU-voltage from the phase voltage $U_{hac}$ of the input coil 10 and thus forms the sinusoidal voltage $U_{12}$, which is transferred to the consumer.

Another variant of the topology of the single-phase HAC grid provides that one Δ2-generator 13 each is used with two output coils. One output coil each of the Δ2-generator 13 couples one ΔU-voltage each in one grid coil 34 and 35, respectively, and one output coil each of the Δ2-generator 14 couples one ΔU voltage each from the grid coil 36 and 37, respectively, of a loading grid transformer 6 so that the loading grid transformer 6 transforms the sinusoidal phase voltage $U_{hac}$ to the sinusoidal voltage $U_{12}$.

The phase positions of the harmonic voltages relative to the fundamental component shift along the conductor path of the HAC grid due to the conductor impedances. The phase shifts of the $U_h$ and $U_s$ voltages increase compared to the phase voltages $U_{hac}$ with the length of the conductors that connect the grid transformers. The phase shifts of the $U_h$ and $U_s$ voltages increase the amplitude of the hypersinusoidal voltage $U_{hle}$, as a result of which the phase voltages $U_{hac}$ have to be reduced, which causes the grid power $P_{hac}$ to be decreased.

A predetermined maximum phase shift $\Psi_{sx}$ or $\Psi_{hx}$ for the $U_s$ and $U_h$ voltages limits the conductor length between the S- and the H-generators. If the phases of the $U_s$ and $U_h$ voltages at the beginning of the lines with the respective phase values $-0.5*\Psi_{sx}$ or $-0.5*\Psi_{hx}$ are generated, then these phase values are $0.5*\Psi_{sx}$ or $0.5*\Psi_{hx}$ at the end of the lines. As a result, this pilot control of the phase angle allows for the length between two S- and the H-generators to be doubled.

According to the invention, a plurality of ΔS-generators as well as H-generators are arranged along a grid route. The phase position of the $U_h$ and $U_s$ voltages, which are coupled in along the grid line, is controlled by the H- and ΔS-generators so that the maximum $\Psi_{sx}$ or $\Psi_{hx}$ values are not exceeded.

Instead of a regulating transformer, the H-generator 15 and 16, respectively, can regulate the power which the assigned grid transformer 2 and 6, respectively, in FIG. 4 feeds in or removes. The phase of the regulating voltage $U_r$ varies between −90° and +90° based on the phase voltage $U_{hac}$. According to the prior art, the regulating voltage varies by +/−10% of the phase voltage amplitude. The power of the H-generator must be increased by the controlling power range. As a result, both the active and the reactive power which the transformer 2 and 6, respectively, supplies or removes can be partially or completely regulated.

According to the invention, the $S_1$ generators in an arrangement according to FIG. 4 can extinguish the short-circuit current which flows between the short-circuited conductor 4 of the associated grid coil 3 and ground 7 during a short-circuit.

The amplitude of the short-circuit current depends on the distance between the short-circuit and the grid coil 3. The $S_1$ generator detects the short circuit and builds up the counter voltage required to extinguish the short circuit current. The installed power of the inverter 20 and the coupling transformer 21, according to FIG. 6, increases in the process.

Figure 10:
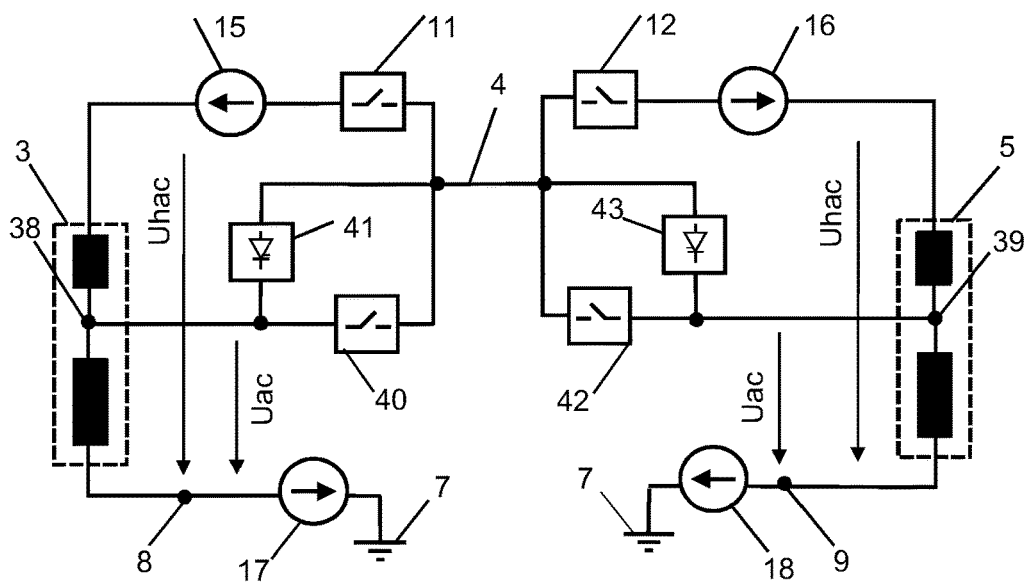
FIG. 10: is a block diagram of a redundant HAC grid.

FIG. 10 shows the structure of a redundant HAC grid. The phase voltage $U_{ac}$ is taken from the outlets 38 and 39, respectively, of the grid coils 3 and 5, respectively. The grid switches 11 and 12, respectively, connect the outlets of the grid coils 3 and 5 with the associated conductors 4, and the pairs of switches 40, 41 and 42, 43, respectively, connect the taps 38 and 39 with the associated conductors 4. Each switch pair 40, 41 and 42, 43, respectively, consists of a mechanical power switch 40 and 42 each and an electronic switch 41 and 43, which is connected in parallel to the mechanical switch 40 and 42, respectively. The electronic switches 41 and 43, respectively, are used when switch-on times less than 100 μs are required, i.e., when the higher $U_{hac}$ value has to be switched very quickly to the lower $U_{ac}$ value.

The HAC grid is operated in two ways: in normal operation as an HAC grid with the higher phase voltage $U_{hac}$ and in the event of a fault or if necessary, as an AC grid with the lower phase voltage $U_{ac}$. During the operation as an HAC grid, the conductors 4 are connected to the outputs of the grid coils 3 and 5, respectively, the grid switches 11 and 12, respectively, are closed and the pairs of switches 40, 41 and 42, 43, respectively, are open. During the operation as an AC grid, the grid switches 11 and 12, respectively, are open and the pairs of switches 40, 41 and 42, 43, respectively, are closed. In addition, all H-generators and all S-generators are bridged so that no $U_h$ or $U_s$ voltages are present. The HAC grid has thus been switched back to the original AC grid.

The conductor-to-conductor voltage $U_{ll}$, which is present in a three-phase AC grid, equals $$\sqrt{3}*U_{ac} \sim 1.71*U_{ac}.$$

The amplitude of the conductor-to-conductor voltage $U_{hll}$ of an HAC grid is equal to twice the amplitude of the phase voltage $U_{ac}$, regardless of the maximum harmonic frequency $F_{ix}$. The $U_{hll}$ voltage is therefore at a maximum ($\sqrt{3}/2-1$)~16% greater than the $U_{ll}$ voltage, even if the phase voltages $U_{hac}$ are greater than 116%*$U_{ac}$ (e.g. 157%*$U_{ac}$). The presented method consequently reduces both the conductor-ground voltages $U_{hle}$ and the conductor-to-conductor voltages $U_{hll}$ and is therefore unique.

The $U_{hll}$ voltage, which is 16% higher at the most, is not a problem for the AC cable 49 according to FIG. 11 if the conductors 4 are individually insulated and shielded and the shields 45 are grounded. An underground cable 43 usually consists of a conductor 4 and an isolator 44, which encloses and insulates the conductor 4, as well as the shield 45 in order to electrostatically decouple the isolator 44 from the environment. As a result, the conductor-to-conductor voltage $U_{hll}$ has no influence on the voltage $U_{hle}$ between the conductor and the grounded shield 45, i.e., on the insulation 44 of the conductor 4. A cable configured in this way can be used in the modified HAC grid without having to make any changes to it.

As shown in FIG. 11, three individual cables can be combined to form an underground cable 49 if the conductors 4 are individually insulated by the isolators 44 and individually shielded by the grounded shields 45. A cable configured in this way can also be used in a modified HAC grid without making any changes to it.

The height of the poles 46 of existing AC lines with overhead conductors, as shown in FIG. 12, remains unchanged despite a higher $U_{hac}$ voltage because the pole height is proportional to the $U_{hle}$ amplitude, which, in the case of an expansion to a HAC grid, remains unchanged, as shown in FIG. 2. In the event of high wind loads, the distance between two adjacent overhead conductors 4 of a cable bracket 50 and 51, respectively, is determined according to the prior art by the oscillation of the overhead conductors 4 on the isolators 62. The air gap between two adjacent conductors insulates a higher voltage ~2*$U_{ac}$ than the voltage $U_{hll}$~1.17*$U_{ac}$. For lines with critical wind loads, however, the distance between adjacent conductors may have to be increased slightly (by <16%), or in the case of heavily oscillating conductors, the HAC grid must be temporarily switched to the AC grid.

FIG. 12 shows a pole for an HAC overhead conductor grid with reduced electrical and magnetic radiation. Most overhead lines contain six conductors, which are grouped in two three-phase HAC systems 47 or 48. The first three-phase HAC system 47 is formed by three conductors 4, and the second three-phase HAC system 48 is formed by a further three conductors 4. The conductors 4 of the two HAC systems 47 and 48 run parallel to one another. The two three-phase HAC systems 47 and 48 ensure a redundant transmission. If one HAC system fails, the transmission continues with the second HAC system but with a reduced output $P_{hac}/2$.

The E-fields of the voltages $U_{hac}$ and $U_h$ of a three-phase HAC system cancel each other out because the sum of the $U_h$ voltages or the $U_{hac}$ voltages is equal to zero. The three identical $U_s$ voltages of an HAC system 47 or 48 do not cancel each other out but are added together. The E-field of the $U_s$ voltage of a three-phase HAC system 47 and 48, respectively, is therefore not compensated.

According to the invention, the currents and voltages of the first HAC system 47 are directed against the currents and voltages of the second HAC system 48, which corresponds to a phase shift of half a period of the grid frequency. The two HAC systems 47, 48 transmit the power in the same direction, but the electric field of the $U_s$ voltage of the HAC system 47 is directed opposite to the electric field of the $U_s$ voltage of the HAC system 48. The two E-fields of the $U_s$ voltages overlap and compensate each other.

The magnetic and electrical residual AC fields of the sinusoidal phase voltages $U_{hac}$ of the HAC system 47 are also directed opposite to the residual AC fields of the HAC system 48. The mutually directed AC residual fields of the two HAC systems 47, 48 overlap and weaken each other by a further 17%.

If a three-phase HAC system 47 or 48 fails, the S- and H-generators of both HAC systems are bridged and the faulty HAC system is switched off. The phase voltages of the operational HAC system are reduced to the $U_{ac}$ value, and the operational HAC system 47 or 48 is operated as a conventional AC grid in the event of a fault if the limit values of the fields generated by $U_s$ are exceeded.

The conventional single-phase power transformers can transform the hypersinusoidal phase-to-ground voltages $U_{hle}$.

The three-phase grid transformers cannot transform the $U_s$ voltages because the $U_s$ voltages are the same for all three phases (common mode) and cancel each other out in the concatenated conductor-to-conductor voltages $U_{hll}$.

Figure 13:
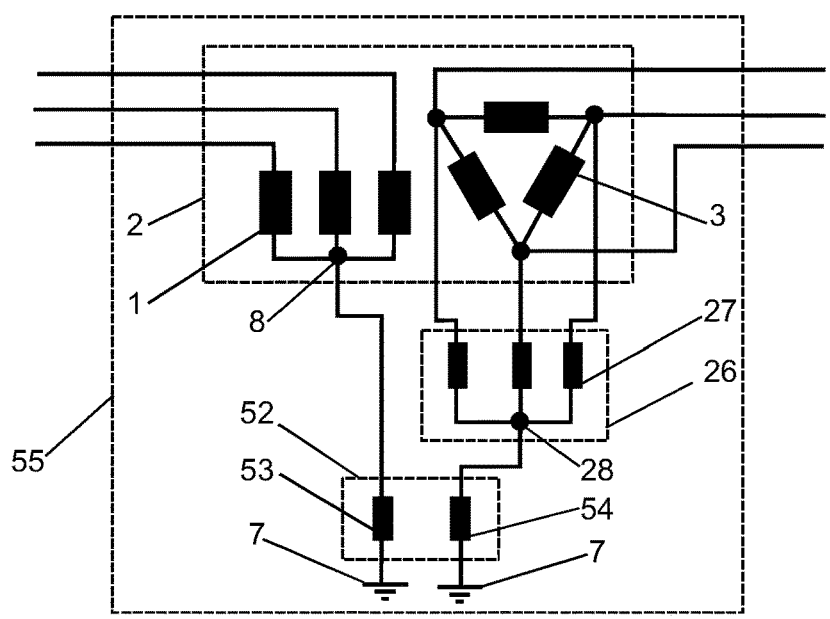
FIG. 13: is the configuration of a three-phase Y-Δ HAC grid transformer.

FIG. 13 shows the structure of a three-phase grid transformer 55 (called an HAC grid transformer) which transforms the sinusoidal phase currents $I_{ac}$ and the phase voltages $U_{hac}$ and the hypersinusoidal conductor-ground voltages $U_{hle}$. This three-phase HAC grid transformer 55 consists of a three-phase grid transformer 2, a grounding transformer 26 and a single-phase transformer 52 with the same ratio as the three-phase grid transformer 2. A three-phase Y-Δ transformer is used in this FIG. 13. The coils 27 of the grounding transformer 26 are connected with the Δ-switched grid coils 3 and form the star connection 28 of the Δ-switched grid coils 3. The input coil of the single-phase transformer 52 is connected between the star connection 8 of the Y-connected coils 1 of the three-phase transformer 2 and ground 7. The voltage applied to the input coil 53 of the single-phase transformer 52 is the $U_s$ voltage of the hypersinusoidal conductor-ground voltage $U_{hle}$ of the HAC grid. The output coil 54 of the single-phase transformer is connected between the star connection 28 and ground 7 and supplies the transformed $U_s$ voltage. A three-phase Δ-Y HAC grid transformer is configured analogous to the three-phase Y-ΔHAC grid transformer.

Figure 14:
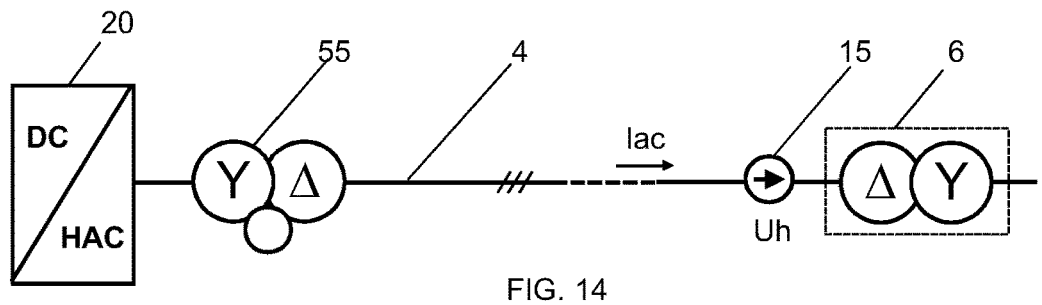
FIG. 14: is a block diagram of an HAC grid with an existing full inverter.

FIG. 14 shows the block diagram of a three-phase HAC grid, the voltages of which are generated by an existing full inverter 20. The AC grid of a solar power plant, a wind power plant as well as a battery storage is connected by means of a full inverter 20 which, according to the prior art, supplies the three sinusoidal $U_{ac}$ voltages to an AC grid transformer. According to the invention, the full inverter 20 generates the three hypersinusoidal conductor-ground voltages $U_{hle}$ with a hypersinusoidal modulation. These $U_{hle}$ voltages are applied to a three-phase HAC grid transformer 55 (FIG. 13), which transforms these voltages. The HAC grid transformer 55 (FIG. 13) can be either the Y-Δ type or the Δ-Y type and transforms the HAC voltages to the conductors 4. The loading HV-AC grid transformer 6 is connected to the HAC grid transformer. The H-generator 15 uncouples the $U_h$ voltage before the loading AC grid transformer 6. The remaining $U_s$ voltage is decoupled from the AC grid transformer 6 (FIG. 14) because the three-phase AC grid transformer 6 cannot transform the $U_s$ voltage.

Synchronous generators are also used in wind power plants as power plant generators and can generate hypersinusoidal voltages directly (HAC synchronous generator). The prerequisite for this is that the air gaps between the poles of the rotor and the stator are formed accordingly.

Figure 15:
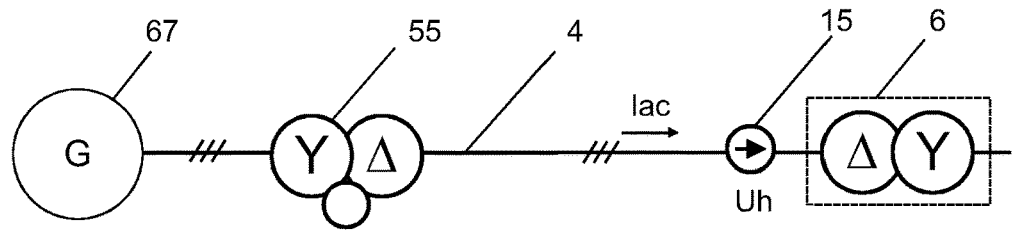
FIG. 15: is an illustration of the connection of an HAC synchronous generator to an HAC grid.

FIG. 15 shows the connection of a three-phase HAC synchronous generator 67 to an HAC grid with a three-phase HAC grid transformer 36, which matches the connection of a three-phase full inverter 20 to a three-phase HAC grid, as shown in FIG. 14.

The currents and voltages of the conductors of a three-phase system scatter unwanted magnetic and electric fields (B- and E-fields). The magnetic and electric fields of the phase currents and the phase voltages of a three-phase AC system weaken each other. The magnetic and electrical residual fields of the systems 47 and 48 according to FIG. 12, however, are added one to another because the currents and the voltages of both systems are synchronous and rectified according to the prior art.

The E-fields of the three-phase voltages $U_{hac}$ and $U_h$ of a three-phase HAC system weaken one another as well. The three identical $U_s$ voltages of the HAC system 47 or 48 shown in FIG. 12, however, do not cancel each other out but rather are added to one another. The E-field of the $U_s$ voltage of a three-phase HAC system 47 or 48 is therefore not compensated.

According to the invention, the currents and voltages of the first system 47 shown in FIG. 12 are directed against the currents and voltages of the second system 48. The two systems 47, 48 transmit the power in the same direction, but the electric field of the $U_s$ voltage of the system 47 is opposite to the electric field of the $U_s$ voltage of the system 48. These fields overlap and compensate each other.

The magnetic and electrical residual AC fields of the sinusoidal phase voltages $U_{hac}$ of the system 44 are also opposite to the fields of the system 45. The residual AC fields of both systems overlap and weaken by a further 16%.

If a three-phase system 47 or 48 fails, the S- and H-generators of both systems are bridged and the faulty system is switched off. The phase voltages of the operational system are reduced to the $U_{ac}$ value, and the operational system 47 or 48 is operated as a conventional AC grid in the event of a fault.

Figure 16:
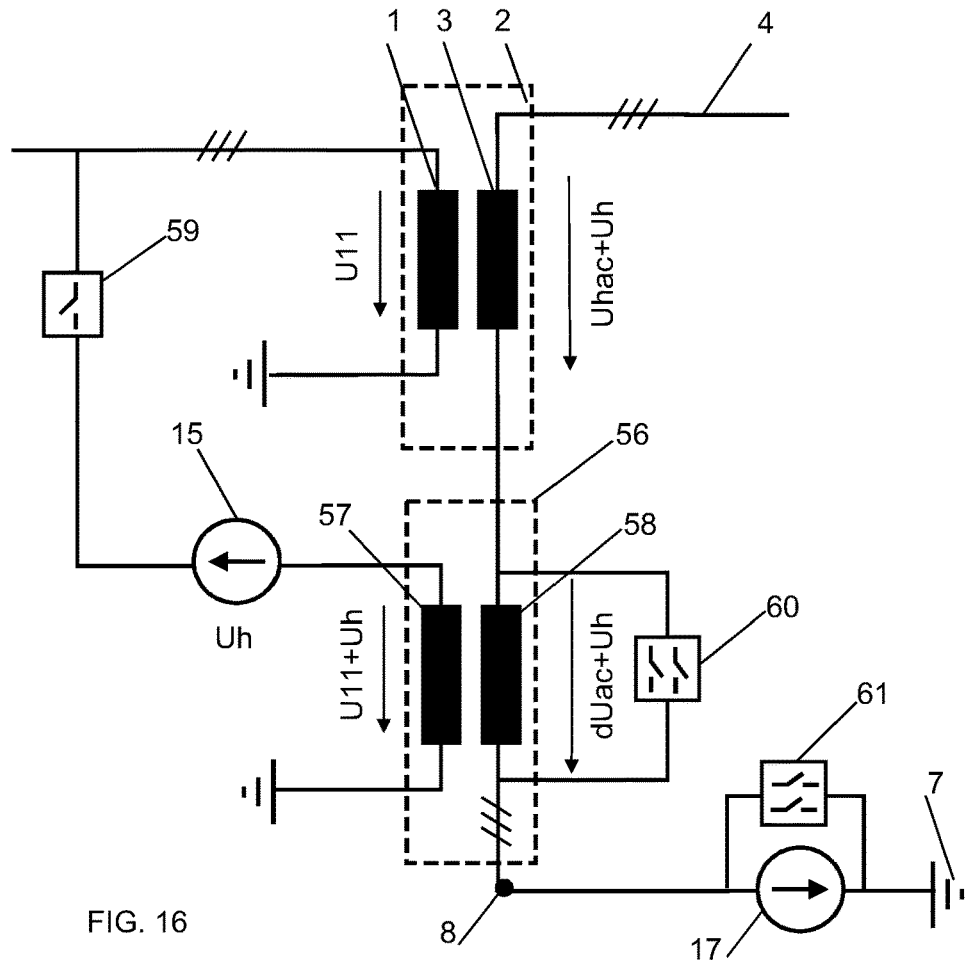
FIG. 16: is a block diagram of a system for coupling an AC grid with an HAC grid with Y-switched grid coils of the grid transformer.

FIG. 16 shows a system which allows a three-phase AC grid to be coupled to a three-phase HAC grid and vice versa. The existing three-phase grid transformer 2 of the AC grid is expanded with a three-phase expansion transformer 56. The expansion transformer 56 transforms the input voltages U11 applied to the input coils 57 into the additional voltages $dU_{ac}$, which are applied to the output coils 58. The additional voltages $dU_{ac}$ are added to the phase voltages $U_{ac}$, as a result of which the $U_{hac}$ voltages are created between the conductors 4 and the star connection of the output coils 58. The output coils 58, which are connected in series with the grid coils 3, are bridged by the switch pair 60, if necessary. The additional voltages $dU_{ac}$ are approx. 16%-25% of the $U_{ac}$ voltages.

The H-generator 15 couples the $U_h$ voltages into the input coils 57 of the expansion transformer 56, which are transformed to the output coils 58. Finally, the $S_1$ generator 17 couples the $U_s$ voltage between the star point 8 and ground 17 whereby the $U_{hle}$ voltages between the conductors 4 and ground 7 are formed. The switch pair 61 bypasses the $S_1$ generator in the event of a fault. As an alternative to the $S_1$ generator, the three output coils 31, 32, 33 of an $S_3$ generator can be connected in series between the output coils 58 of the expansion transformer 56 and the star point 8.

This three-phase system can also be designed as a single-phase system. The single-phase system includes a single-phase grid transformer, a single-phase expansion transformer, an $H_1$ generator and an $S_1$ generator as well as single-phase switches and switch pairs. Instead of single-phase H- and S-generators, a Δ1-generator can be used as well. The input coils 1 of the grid transformer can be switched in Y or in Δ. The output coils 3 of the grid transformer 2 can be switched in Δ or in Y.

In the case of a conductor-ground short circuit, there are overvoltages between the grid coils 3 of the grid transformer 2 and ground 7 or between the output coils 58 of the expansion transformer 56 and ground 7, said overvoltages being up to two times higher than $U_{ac}$. If the existing grid transformers are retained, the $dU_{ac}$ voltage and the $U_h$ or $U_s$ voltages must be bridged.

The expansion transformer 56 must also be protected from over voltages in the event of a fault. The expansion transformer 58 or the $S_1$ generator 17 are protected from the impermissible over voltages by bridging these voltages with the switch pairs 60 and 61, respectively. The grid transformer 2 is protected in the event of a fault in that the $U_{hle}$ and $U_{hac}$ voltages are reduced to the $U_{le}$ and $U_{ac}$ values by the switch pairs 60 and 61, respectively, bridging the voltages $dU_{ac}$, $U_h$, and $U_s$.

The bridging must be done fast (<100 μs) and is implemented with a switch pair 60 and 61, respectively. A switch pair 60 consists of a mechanical switch 24 and an electronic switch 25 connected in parallel and short-circuits very quickly (<100 μs)—see FIG. 6.

The bridging reduces the line-to-ground voltages $U_{hle}$ and the phase voltages $U_{hac}$, respectively, to the lower AC values $U_{ac}$ and $U_{le}$, respectively. This relieves the insulation of the grid transformer 2 in the event of a fault. The insulation of the expansion transformer 56 is not stressed in the event of a fault because the voltages at the output coils 58 are set to zero by the bridging, and the input coils 57 of the expansion transformer 56 are disconnected from the grid by the circuit breaker 59.

According to FIG. 16, the expansion transformer 56 can be insulated for a voltage class lower than the grid transformers. This significantly reduces the cost of converting an existing AC system.

Figure 17:
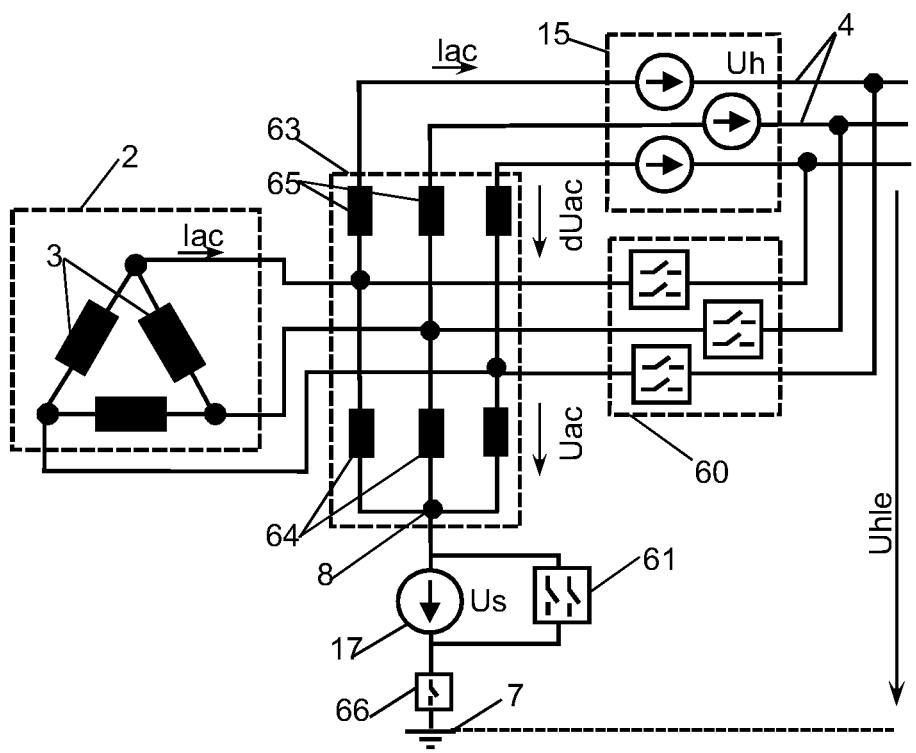
FIG. 17: is a block diagram of a system for coupling a three-phase AC grid with an HAC grid using a three-phase autotransformer.

Another possibility of coupling a three-phase AC grid with a three-phase HAC grid is to expand a three-phase grid transformer 2 with a three-phase autotransformer 63, as shown in FIG. 17.

The grid coils 3 of the grid transformer 2 are connected in delta. The grounding coils 64 of the autotransformer 63 are star-connected and form the star connection 8. The grid coils 65 of the autotransformer 63 supply the additional voltages $dU_{ac}$ and conduct the phase current $I_{ac}$. The higher phase voltages $U_{hac}=U_{ac}+dU_{ac}$ are thus created at the output of the autotransformer 63. An $H_3$ generator 15 couples the three associated $U_h$ voltages into the grid coils 65 of the autotransformer 63. An $S_1$ generator 17 couples the $U_s$ voltage between the star connection 8 of the grounding coils 64 and ground 7 and forms the $U_{hle}$ voltages of the HAC grid between the conductors 4 and ground 7. The three-phase switch pair 60 bridges the grid coils 64 of the autotransformer 63 and the $H_3$ generator 15, if necessary. The switch pair 61 simultaneously bridges the $S_3$ generator and the disconnector 66 simultaneously disconnects the grounding coils 64 of the autotransformer 63 from ground 7.

The system in FIG. 17 can also be implemented with a single-phase grid transformer 2 and with a single-phase autotransformer for single-phase AC grids. The single-phase system includes a single-phase grid transformer, a single-phase autotransformer, an $H_1$ generator and an $S_1$-generator as well as the single-phase disconnector 66 and the single-phase switch pairs 60 and 61. Instead of single-phase $H_1$ and $S_1$ generators, a $\Delta 1$ generator can be used as well. The input coils 1 of the single-phase grid transformer 2 can be switched in Y or in $\Delta$. The output coils 3 of the grid transformer 2 can be switched in $\Delta$ or in Y.

LIST OF TERMS AND REFERENCE SIGNS $U_{ac}$ Sinusoidal phase voltage of the AC grid
$U_{hac}$ Sinusoidal phase voltage of the HAC grid
$U_{11}, U_{12}$ Sinusoidal input voltages of the grid transformers of the AC grid
$dU_{ac}$ Sinusoidal additional voltage, equal to ($U_{hac} - U_{ac}$)
$U_{le}$ Sinusoidal conductor-ground voltage of the AC grid
$U_{hle}$ Hypersinusoidal conductor-ground voltage of an HAC grid
$U_{lex}$ Maximum value of the conductor-ground voltage of the AC grid and the HAC grid
$U_{ll}$ Conductor-to-conductor (concatenated) voltage of the AC grid
$U_{hll}$ Conductor-to-conductor (concatenated) voltage of the HAC grid
$I_{ac}$ Sinusoidal phase current of the AC grid
$I_{acr}$ Sinusoidal phase current of the AC grid, phase R (FIG. 8)
$I_{acs}$ Sinusoidal phase current of the AC grid, phase S (FIG. 8)
$I_{act}$ Sinusoidal phase current of the AC grid, phase T (FIG. 8)
$P_{ac}$ Power of the AC grid
$P_{hac}$ Power of the HAC grid
$\Delta U$ Differential voltage generated by a $\Delta$-generator
$F_1$ Fundamental grid frequency
$F_{ix}$ Maximum frequency of the harmonics of the $\Delta U$-voltage
$U_s$ Harmonic component of the $\Delta U$-voltage generated by an S-generator
$U_h$ Harmonic component of the $\Delta U$-voltage generated by an H-generator
$\Delta_1, \Delta_3$ Single phase $\Delta$-generator, three-phase $\Delta$-generator
$\Delta_2$ $\Delta_1$ generator with two output coils
$H_1, H_3$ Single-phase H-generator, three-phase H-generator
$H_2$ Single-phase H-generator with two output coils
$S_1, S_3$ S-generator with one output coil, S-generator with three output coils
1 Input coil to the grid transformer 2
2 (Feeding) grid transformer
3 Grid coil to the grid transformer 2
4 Conductor
5 Grid coil to the grid transformer 6
6 (Loading) grid transformer
7 Ground
8 Star point of the grid coils (FIG. 1, FIG. 3, FIG. 4, FIG. 5, FIG. 9, FIG. 10, FIG. 16, FIG. 17)
9 Star point of the grid coils (FIG. 1, FIG. 3, FIG. 4, FIG. 5, FIG. 9, FIG. 10)
10 Input coil for the grid transformer 6
11 Grid switch for the grid transformer 2 (FIG. 1, FIG. 10)
12 Grid switch for the grid transformer 6 (FIG. 1, FIG. 10)
13 $\Delta$-generator for the grid transformer 3 (FIG. 3, FIG. 9)
14 $\Delta$-generator for the grid transformer 6 (FIG. 3, FIG. 9)
15 $H_3$ generator for the grid transformer 3 (FIG. 4, FIG. 5, FIG. 10, FIG. 14, FIG. 15, FIG. 16, FIG. 17)
16 $H_3$ generator for the grid transformer 6 (FIG. 4, FIG. 5, FIG. 10)
17 $S_1$ generator (FIG. 4, FIG. 16, FIG. 17)
18 Terminating impedance (FIG. 4)
19 Voltage source for 20 (FIG. 4, FIG. 20)
20 Single-phase/three-phase inverter (FIG. 6, FIG. 8, FIG. 14)
21 Single-phase/three-phase coupling transformer for 20 (FIG. 6)
22 Input coil of the coupling transformer 21 (FIG. 6, FIG. 8)
23 Output coil of the coupling transformer 21 (FIG. 6)
24 Mechanical switch 24 of the switch pair 60 (FIG. 6)
25 Electronic switch 25 of the switch pair 60 (FIG. 6)
26 Grounding transformer (FIG. 7, FIG. 13)
27 Coils of the grounding transformer (FIG. 7, FIG. 13)
28 Star point of the coils 27 (FIG. 7, FIG. 13)
29 Coupling transformer of an $S_3$ generator (FIG. 8)
30 Common magnetic core of 29 (FIG. 8)
31 Output coil for 29 (FIG. 8)
32 Output coil for 29 (FIG. 8)
33 Output coil for 29 (FIG. 8)
34 Grid coil of the single-phase grid transformer 2 (FIG. 9)
35 Grid coil of the single-phase grid transformer 2 (FIG. 9)
36 Grid coil of the single-phase grid transformer 3 (FIG. 9)
37 Grid coil of the single-phase grid transformer 3 (FIG. 9)
38 Taps of the grid coil 3 with the voltage $U_{ac}$ (FIG. 10)
39 Taps of the grid coil 5 with the voltage $U_{ac}$ (FIG. 10)
40 Mechanical switch of the grid coils 3 (FIG. 10)
41 Electronic switch of the grid coils 3 (FIG. 10)
42 Mechanical switch of the grid coils 5 (FIG. 10)
43 Electronic switch of the grid coils 5 (FIG. 10)
44 Insulation, isolator around the conductor 4 of an underground cable 49
45 Shield around the isolator 44
46 Overhead conductor pole
47 Three-phase HAC system (FIG. 12)
48 Three-phase HAC system with currents and voltages opposite to 47 (FIG. 12)
49 Underground cable with three conductors
50 Left cable bracket of the overhead conductor pole 46
51 Right cable bracket of the overhead conductor pole 46
52 Single-phase transformer (FIG. 13)
53 Input coil for 52 (FIG. 13)
54 Output coil for 52 (FIG. 13)
55 Three-phase HAC grid transformer (FIG. 13, FIG. 14, FIG. 15)
56 Three-phase expansion transformer (FIG. 16)
57 Input coils of the expansion transformer 56
58 Grid coils for the expansion transformer 56 (FIG. 16)
59 Grid switch for the expansion transformer 56
60 Switch pair (FIG. 6, FIG. 16, FIG. 17)
61 Switch pair (FIG. 16, FIG. 17)
62 Isolator on pole cable bracket 46 (FIG. 12)
63 Autotransformer (FIG. 17)
64 Grounding coils of 63
65 Grid coils of 63
66 Disconnector (FIG. 17)
67 Three-phase HAC synchronous generator (FIG. 15)

The invention claimed is:

1. A method for increasing power of a single-phase or a multi-phase AC grid, which comprises at least one feeding grid transformer with grid coils and at least one loading grid transformer with grid coils, which are connected to conductors and conduct nominal sinusoidal phase currents $I_{ac}$ with fundamental grid frequency $F_1$, wherein the grid coils for the at least one feeding grid transformer and/or the at least one loading grid transformer carry sinusoidal phase voltages $U_{ac}$ and wherein the voltages $U_{le}$ between the conductors and ground do not exceed a maximum insulation voltage $U_{lex}$, the method comprising:

increasing the phase voltages at outputs of the grid coils for the at least one feeding grid transformer and the grid coils for the at least one loading grid transformer to a value $U_{hac}$ that is greater than $U_{ac}$ and less than $(\pi/2)*U_{ac}$, as a result of which the AC grid can transmit more power with the nominal phase currents $I_{ac}$, a Δ-generator is respectively connected between a grid coil of the grid coils for the at least one feeding grid transformer and a grid coil of the grid coils for the at least one loading grid transformer and a line and a differential voltage is coupled and decoupled, whereby amplitude of voltages $U_{hle}$ between the conductors and ground is limited to the insulation voltage $U_{lex}$ and the amplitude of the voltages between conductors $U_{hll}$ is reduced.

2. The method for increasing the power of a single-phase or a multi-phase AC grid according to claim 1, wherein a number of phases of the differential voltage is equal to a number of phases of the AC grid, each differential voltage is formed from a single-phase voltage $U_s$ and from a single or a multi-phase voltage $U_h$, whereby the $U_s$ voltage is the same for all phases, consists of harmonic voltages with frequencies equal to F1*3*(2*i−1) with i=1,2,3 . . . and is generated by at least one single-phase S-generator, and each $U_h$ voltage is equal to a difference between an associated ΔU voltage and the $U_s$ voltage and is formed by one H-generator each, and is coupled or decoupled between an associated grid coil for the at least one feeding grid transformer and grid coil for the at least one loading grid transformer, respectively, and the associated conductors with only reactive power being coupled or decoupled from the grid with S- and H-generators so that the increase in the grid power occurs solely due to a higher phase voltage $U_{hac}$.

3. The method according to claim 1, wherein one H-generator is connected to a grid transformer, and generates a regulating voltage $U_r$ in addition to a $U_h$ voltage, which has a variable phase and a variable amplitude, with which a reactive power and a active power, which the at least one feeding grid transformer and the at least one loading grid transformer, respectively, supplies or removes, is controlled by changing the phase and the amplitude of the regulating voltage $U_r$ by means of an associated H-generator, respectively.

4. The method according to claim 1, wherein an $S_1$ generator, connected between a star point of the grid coils of the ground, extinguishes a short-circuit current, which occurs in an event of a short circuit between one of the conductors and the ground.

5. The method according to claim 1, wherein, if necessary, additional $U_s$ and $U_h$ voltages between the ground and the conductors, which connect two adjacent grid transformers of the at least one feeding grid transformer and the at least one loading grid transformer, are coupled with a phase in such a way that the phase shifts of the $U_h$ voltages and the $U_s$ voltages are limited along the conductor with reference to an assigned phase voltages $U_{hac}$.

6. The method according to claim 1, wherein the grid is three-phase, that at least one $S_1$ generator is connected between a star connection of the grid coils of at least one feeding grid transformer and the ground and that the star connections of the grid coils of a remaining grid transformers of the at least one loading grid transformer remain free, or are grounded with one terminating impedance each, and/or that three $U_s$ voltages are generated with at least one $S_3$ generator between one grid coil of the at least one feeding grid transformer each and associated conductors, wherein the star connections of the grid coils, which are connected to the $S_3$ generators, are grounded and the star connections of the grid coils, which are not connected to $S_3$ or $S_1$ generators, remain free, or are grounded with a terminating impedance each, as well as one $H_3$ generator, respectively, wherein each of these $H_3$ generators is connected to each grid transformer for the at least one feeding grid transformer or the at least one loading grid transformer and is connected either on input coils, respectively, or on the grid coils, respectively, of the grid transformer for the at least one feeding grid transformer and the at least one loading grid transformer, respectively.

7. The method according to claim 1, wherein a three-phase HAC grid has at least one of the at least one feeding grid transformer with Δ-switched grid coils, which are connected to a Y-bound grounding coils of a grounding transformer, and either a star connection of the grounding coils is connected to ground with an $S_1$ generator or an $S_3$ generator is connected between the grounding coils and the grounded star connection.

8. The method according to claim 1, for a three-phase HAC grid with overhead conductors, consisting of a first three-phase HAC system and a second three-phase HAC system which run spatially parallel to one another, wherein the phase voltages $U_{hac}$, the phase currents $I_{ac}$ and the conductor-ground voltages $U_{hle}$ of the first HAC system are opposite to the phase voltages $U_{hac}$, to the phase current $I_{ac}$ and to the $U_{hle}$ voltages of the second HAC system, whereby electric fields that are generated by the voltages of both HAC systems partially or completely cancel each other out, and magnetic fields that are generated by the phase currents of both HAC systems partially or completely cancel each other out.

9. The method for increasing the power of a single-phase AC grid according to claim 1, wherein either every single-phase grid transformer for the at least one feeding grid transformer and the at least one loading grid transformer, respectively, is provided with two identical grid coils and each is assigned to one corresponding Δ1-generator, with which one differential voltage each is coupled into an input coil of the feeding grid transformer, as well as with one Δ1-generator each, the differential voltage is decoupled from each of an output coil of the loading grid transformer, or, with one Δ₂-generator each, one differential voltage is coupled into one grid coil each of the feeding grid transformer, and, with one Δ₂-generator each, the differential voltage is decoupled from one corresponding grid coil of the two identical grid coils of a loading power transformer.

10. A system for carrying out the method according to claim 1, wherein a three-phase HAC transformer, which transforms the conductor-ground voltages $U_{hle}$ and the phase voltages $U_{hac}$ from a three-phase Δ-Y or Y-Δ grid transformer, and from a three-phase grounding transformer, the coils of which connect the outputs of Δ-switched grid coils to a star connection, and consists of a single-phase transformer, wherein an input coil of the single-phase transformer is connected between the star connection and ground and the output coil of the single-phase transformer is connected between the star connection and ground.

11. The system for carrying out the method according to claim 10, wherein either a three-phase inverter is available, which converts a full grid power $P_{hac}$, as well as the phase voltages $U_{hac}$, which generates harmonic voltages $U_h$ and $U_s$, or in that a three-phase rotating generator is available, which supplies the full grid power $P_{hac}$ and generates the phase voltages $U_{hac}$ and the harmonic voltages $U_h$ and $U_s$, a three-phase HAC grid transformer transforms the $U_{hac}$, the $U_h$ and the $U_s$ voltages of both variants and connects the conductors of an HAC grid transformer to a downstream three-phase AC grid transformer, wherein an $H_3$ generator decouples the $U_h$ voltages in front of input coils of the downstream AC grid transformer.

12. The system for carrying out the method according to claim 10, wherein an underground cable consists of one or more conductors, wherein each conductor is insulated by an isolator and shielded by a grounded shield.

13. The system for carrying out the method according to claim 10, wherein input coils of a three-phase grid transformer are connected to the input coils of a three-phase expansion transformer, the grid coils of the expansion transformer are connected to those of the grid coils of the feeding grid transformer and the insulation voltages of the expansion transformer are designed to be lower or equal to the insulation voltages of the grid transformer, the grid coils of the expansion transformer are connected between the grid coils of the feeding grid transformer and a star connection, and an $H_3$ generator is connected between the input coils of the expansion transformer and the input coils of the feeding grid transformer, or either an $S_1$ generator is connected between the star connection and ground, or an $S_3$ generator is connected between the grid coils of the expansion transformer and the grounded star connection, as well as a switch pair which bridges the grid coils of the expansion transformer in the event of a fault, and a switch pair that bridges the $S_1$ generator or the $S_3$ generator in the event of a fault or if necessary, and consequently reduces the $U_{hac}$ or $U_{hle}$ voltages in the event of a fault at the output of the system to the $U_{ac}$ or $U_{le}$ voltages so that the insulation of the feeding grid transformer and the expansion transformer are not overloaded in the event of a fault.

14. The system for carrying out the method according to claim 10, wherein a three-phase grid transformer with A-switched grid coils is connected to a three-phase autotransformer, whose grid coils transform the phase voltages $U_{ac}$ to a higher voltages $U_{hac}$ and whose ground coils form a star connection, and in that an $H_3$ generator couples an associated $U_h$ voltages and an $S_1$ generator connects a star point to ground and couples $U_s$ voltage, wherein, in the event of a fault, the switch pair short-circuits the $U_h$-generators and the grid coils, a switch pair bridges the $U_s$-generator and an insulating switch disconnects the star connection from ground.

15. The system according to claim 13,
wherein the feeding grid transformer and an associated expansion transformer are single-phase, or the feeding grid transformer and an associated autotransformer are single-phase, and in both variants, either a single-phase $H_1$ generator and an $S_1$ generator each or a $\Delta_1$-generator each, are used, and the switch pairs or a disconnector are also single-phase.

* * * * *